US011704868B2

(12) United States Patent
Loodin Ek

(10) Patent No.: US 11,704,868 B2
(45) Date of Patent: *Jul. 18, 2023

(54) SPATIAL PARTITIONING FOR GRAPHICS RENDERING

(71) Applicant: Electronic Arts Inc., Redwood City, CA (US)

(72) Inventor: Alexander Loodin Ek, Burnaby (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,064

(22) Filed: Apr. 13, 2022

(65) Prior Publication Data
US 2022/0343594 A1 Oct. 27, 2022

Related U.S. Application Data

(63) Continuation of application No. 17/069,659, filed on Oct. 13, 2020, now Pat. No. 11,335,058.

(51) Int. Cl.
G06T 17/00 (2006.01)
G06T 15/20 (2011.01)
A63F 13/63 (2014.01)

(52) U.S. Cl.
CPC ............ G06T 17/005 (2013.01); A63F 13/63 (2014.09); G06T 15/20 (2013.01); G06T 2210/61 (2013.01)

(58) Field of Classification Search
CPC ... G06T 17/005; G06T 15/20; G06T 2210/61; A63F 13/60; A63F 13/63
See application file for complete search history.

(56) References Cited

U.S. PATENT DOCUMENTS 8,422,763 B2 4/2013 Guitierrez
8,774,470 B1 7/2014 Schmidt
8,964,052 B1 2/2015 Wooley et al.
(Continued)

OTHER PUBLICATIONS

Zhang, Jianting, and Le Gruenwald. "Efficient Quadtree Construction for Indexing Large-Scale Point Data on GPUs: Bottom-Up vs. Top-Down." ADMS@VLDB. 2019. (Year: 2019).*

(Continued)

Primary Examiner — Daniel F Hajnik
(74) Attorney, Agent, or Firm — Knobbe, Martens, Olson & Bear, LLP

(57) ABSTRACT

An improved virtual environment creation and testing process can be achieved by a combination of spatial partitioning and reverse tree generation. The reverse tree may be representative of the virtual environment and may be generated starting from a smallest portion or zone of the virtual environment (represented as a leaf node) and expanding up towards a root node representative of the entire virtual environment. Advantageously, the system can add new zones to the virtual environment and representative tree data structure that are external to the existing virtual environment without generating a new tree data structure. Thus, the computing resources utilized by the system disclosed herein may be significantly reduced compared to existing processes while improving the flexibility of the spatial partitioning and tree generation process thereby enabling spatial partitioning to be performed in real or near real time as a developer authors the virtual environment.

20 Claims, 12 Drawing Sheets

(56) References Cited

U.S. PATENT DOCUMENTS

| | | |
|---|---|---|
| 9,669,296 B1 | 6/2017 | Hibbert et al. |
| 9,782,668 B1 | 10/2017 | Golden et al. |
| 10,186,049 B1 | 1/2019 | Boardman |
| 10,369,472 B1 | 8/2019 | Mattar et al. |
| 10,818,070 B2 | 10/2020 | Liu et al. |
| 10,922,882 B2 | 2/2021 | Liu et al. |
| 11,331,575 B2 | 5/2022 | Mattar et al. |
| 11,410,372 B2 | 8/2022 | Liu et al. |
| 2002/0090985 A1 | 7/2002 | Tochner et al. |
| 2003/0058238 A1 | 3/2003 | Doak |
| 2003/0198402 A1 | 10/2003 | Zhang et al. |
| 2004/0027344 A1 | 2/2004 | Ohto |
| 2005/0264566 A1 | 12/2005 | Sommers |
| 2006/0223635 A1 | 10/2006 | Rosenberg |
| 2007/0021166 A1 | 1/2007 | Mattila |
| 2008/0146338 A1 | 6/2008 | Bernard et al. |
| 2009/0005140 A1 | 1/2009 | Rose et al. |
| 2009/0028380 A1 | 1/2009 | Hillebrand et al. |
| 2009/0102835 A1 | 4/2009 | Mikhailov |
| 2010/0215250 A1 | 8/2010 | Zhu |
| 2010/0306825 A1 | 12/2010 | Spivack |
| 2011/0090215 A1 | 4/2011 | Ohta |
| 2012/0208636 A1 | 8/2012 | Feige |
| 2012/0264518 A1 | 10/2012 | Rouille |
| 2012/0306850 A1 | 12/2012 | Balan |
| 2014/0104316 A1 | 4/2014 | Sharma et al. |
| 2014/0267273 A1 | 9/2014 | Kontkanen |
| 2014/0278847 A1 | 9/2014 | Gallo |
| 2014/0306866 A1 | 10/2014 | Miller |
| 2015/0228114 A1 | 8/2015 | Shapira |
| 2016/0180540 A1 | 6/2016 | Lookingbill et al. |
| 2016/0196596 A1 | 7/2016 | Van Wie et al. |
| 2017/0243352 A1 | 8/2017 | Kutliroff |
| 2019/0026956 A1 | 1/2019 | Gausebeck |
| 2019/0178643 A1 | 6/2019 | Metzler et al. |
| 2020/0030700 A1 | 1/2020 | Mattar et al. |
| 2020/0129862 A1 | 4/2020 | Liu |
| 2020/0312042 A1 | 10/2020 | Sardari et al. |
| 2021/0027531 A1 | 1/2021 | Liu et al. |
| 2021/0082172 A1 | 3/2021 | Liu et al. |

OTHER PUBLICATIONS

Wortel, Hans . "Optimizing octree updates for visibility determination on dynamic scenes." Master's Thesis, Leiden Institute of Advanced Computer Science (LIACS), Leiden University (2011). (Year: 2011).*

Böonning, Ralf, and Heinrich Müuller. "Interactive sculpturing and visualization of unbounded voxel volumes." Proceedings of the seventh ACM symposium on Solid modeling and applications. 2002. (Year: 2002).*

Clement et al., "Adaptable aging factor for multiple objects and colorations",Elsevier, Computers & Graphics, 34, pp. 460-467, 2010.

Clement et al., "Enhancing Image-Based Aging Approaches", The Eurographics Association, Eurographics, 2011, Short pages.

Gunther et al., "GPU-accelerated Interactive Material Aging", The Eurographics Association, in Vision, Modeling and Visualization, 2012.

Dai et al., "ScanComplete: Larege-Scale Scene Completion and Semantic Segmentation for 3D Scans", Jun. 23, 2018, IEEE, 2018 IEEE/CVF Conference on Computer Vision and Pattern Recognition.

Hecht et al. "Automatic identification of building types based on topographic databases—a comparison of different data sources," Intl J of Cartograph (2015) vol. 1:1 (18-31).

Ingress FAQ. reddit.com. Online. 2015. Accessed via the Internet. Accessed Jul. 31, 2021. <URL: https://www.reddit.com/r/ingress/wiki/faq#wiki_portals> (Year: 2015).

Karsch et al., "Rendering Synthetic Objects into Legacy Photographs", ACM, Dec. 2011, ACM Transactions on Graphics, vol. 30, No. 6, article 157, pp. 1-12.

Li et al., "Database-Assisted Object Retrieval for Real-Time 3D Reconstruction", Jun. 22, 2015, The Eurographics Association, Computer Graphics Forum, vol. 34, No. 2.

Qi, Jianzhong, et al. "Theoretically Optimal and Empirically Efficient r-trees with Strong Parallelizability." Proceedings of the VLDB Endowment 11.5 (2018): 621-634. (Year: 2018).

Wang et al., "Holistic 3D Scene Understanding from a Single Geo-tagged Image", Jun. 12, 2015, IEEE, Urtasun; Proceedings of the IEEE Conference on Computer Vision and Pattern Recognition (CVPR), 2015, pp. 3964-3972.

Zamri, Muhamad Najib, et al. "Real-Time Data Retrieval Technique for Virtual GIS," Advance in Spatial Information System: Application Development in Geographical Information System, Chapter 10, pp. 197 to 211, Jan. 2007. (Year: 2007).

Zia et al., "Towards Scene Understanding with Detailed 3D Object Representations", Nov. 4, 2014, Springer, International Journal of Computer Vision, 112: 188-203.

* cited by examiner

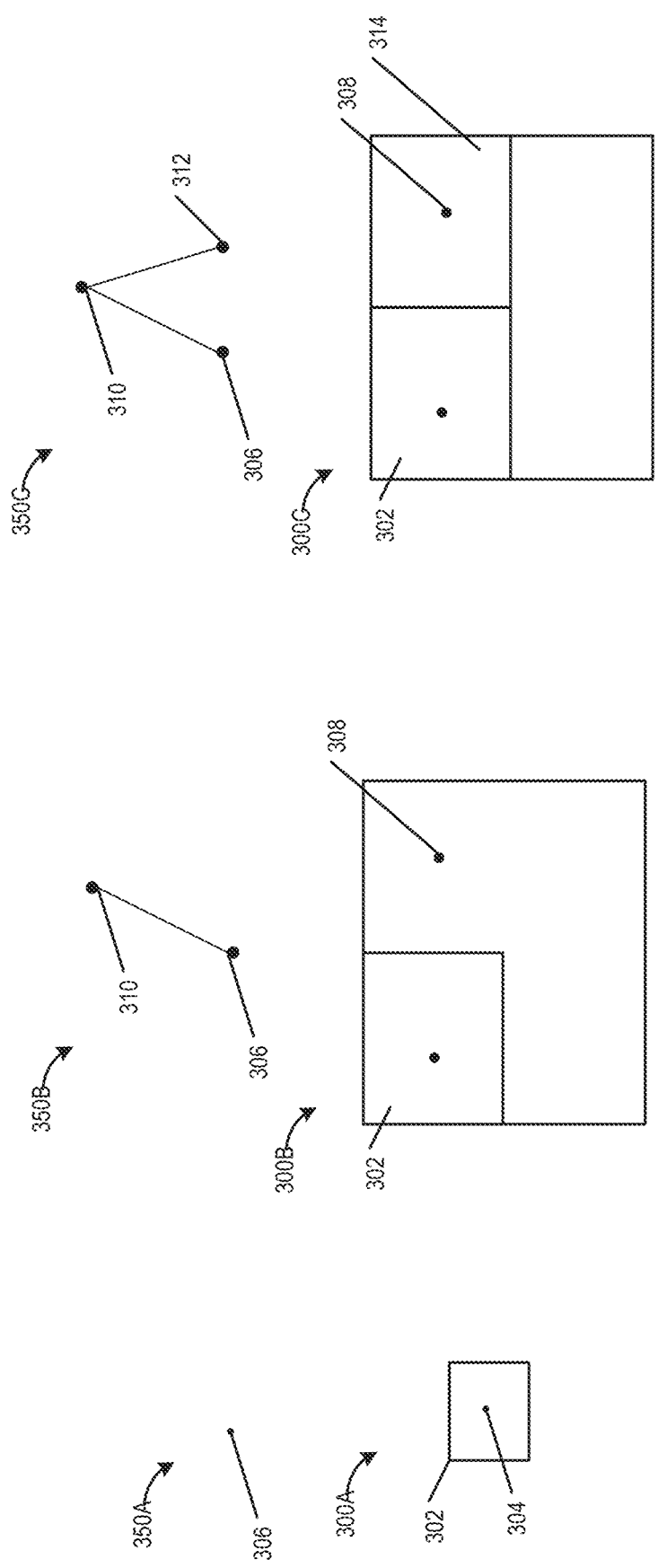

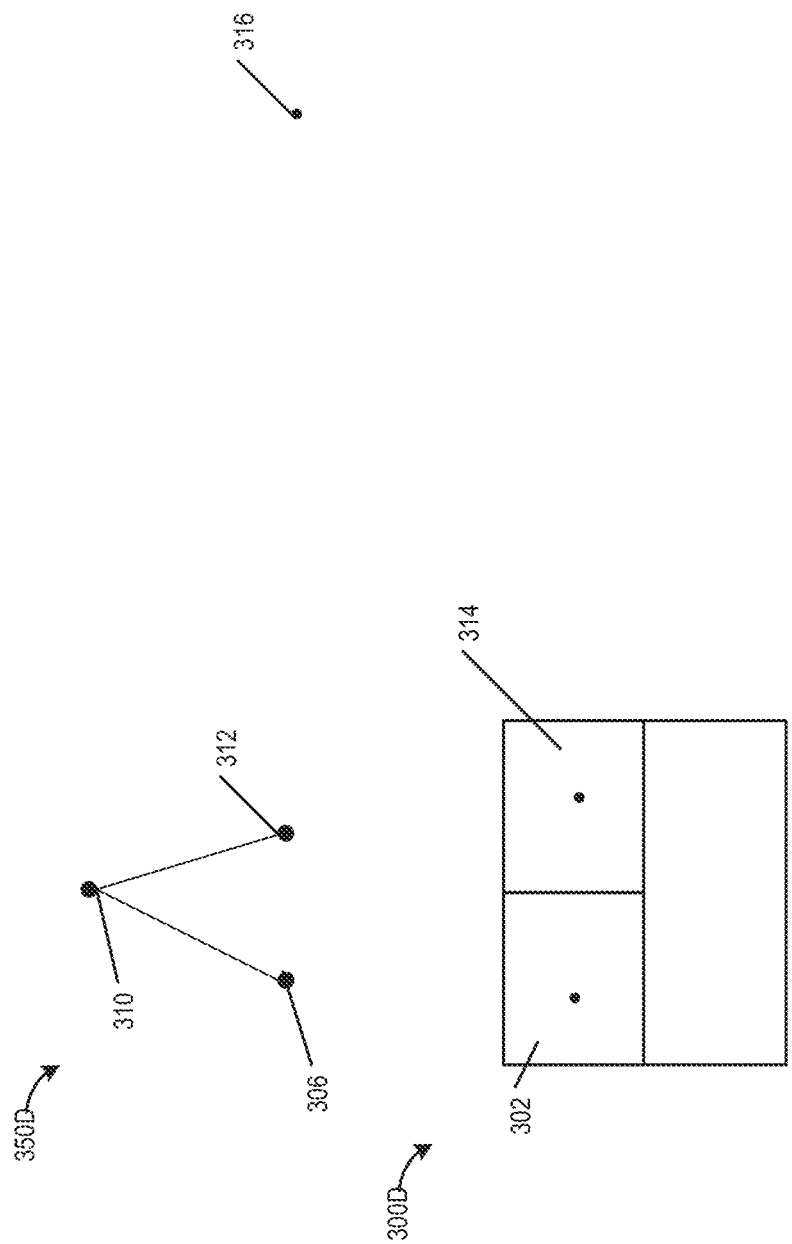

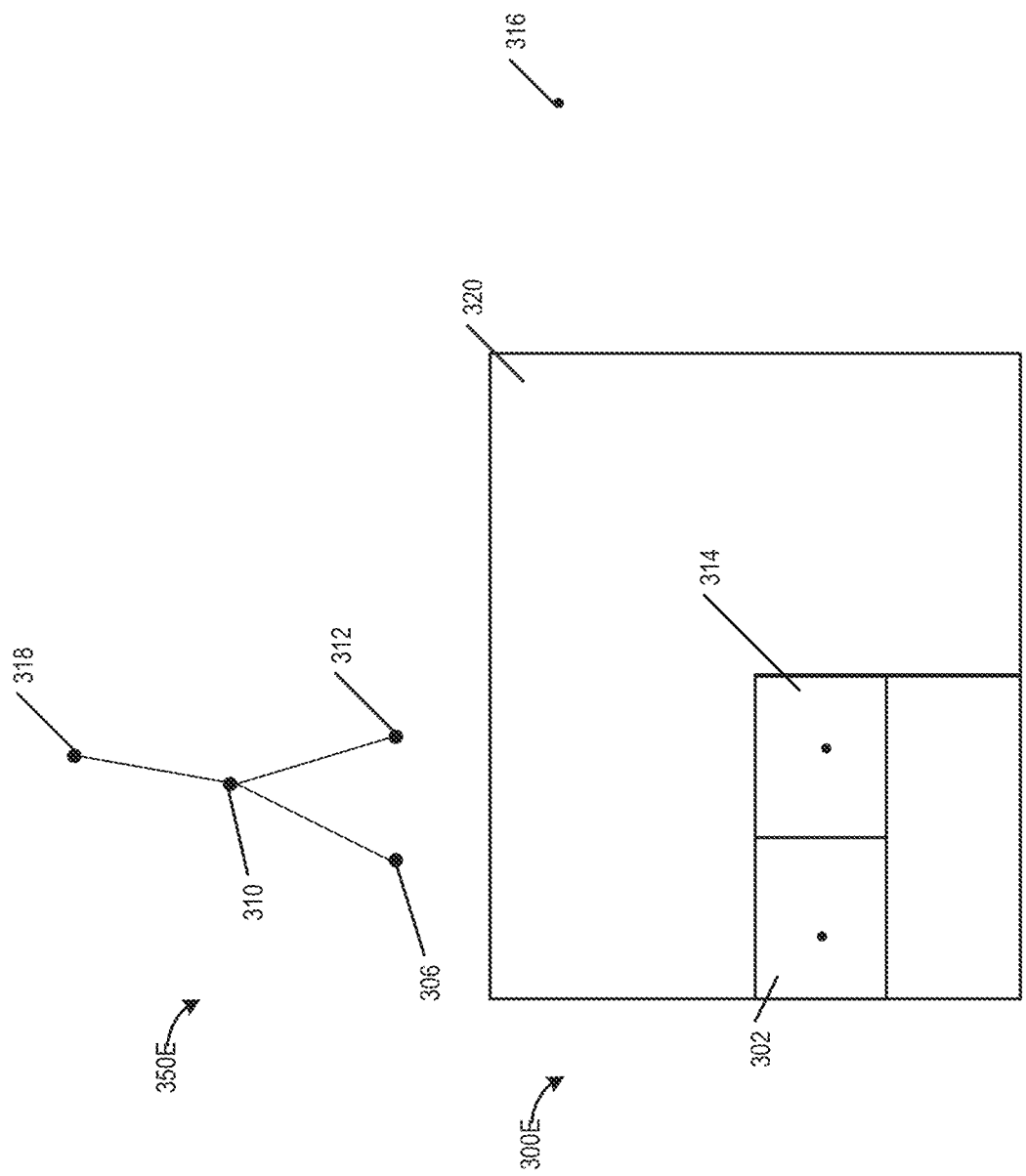

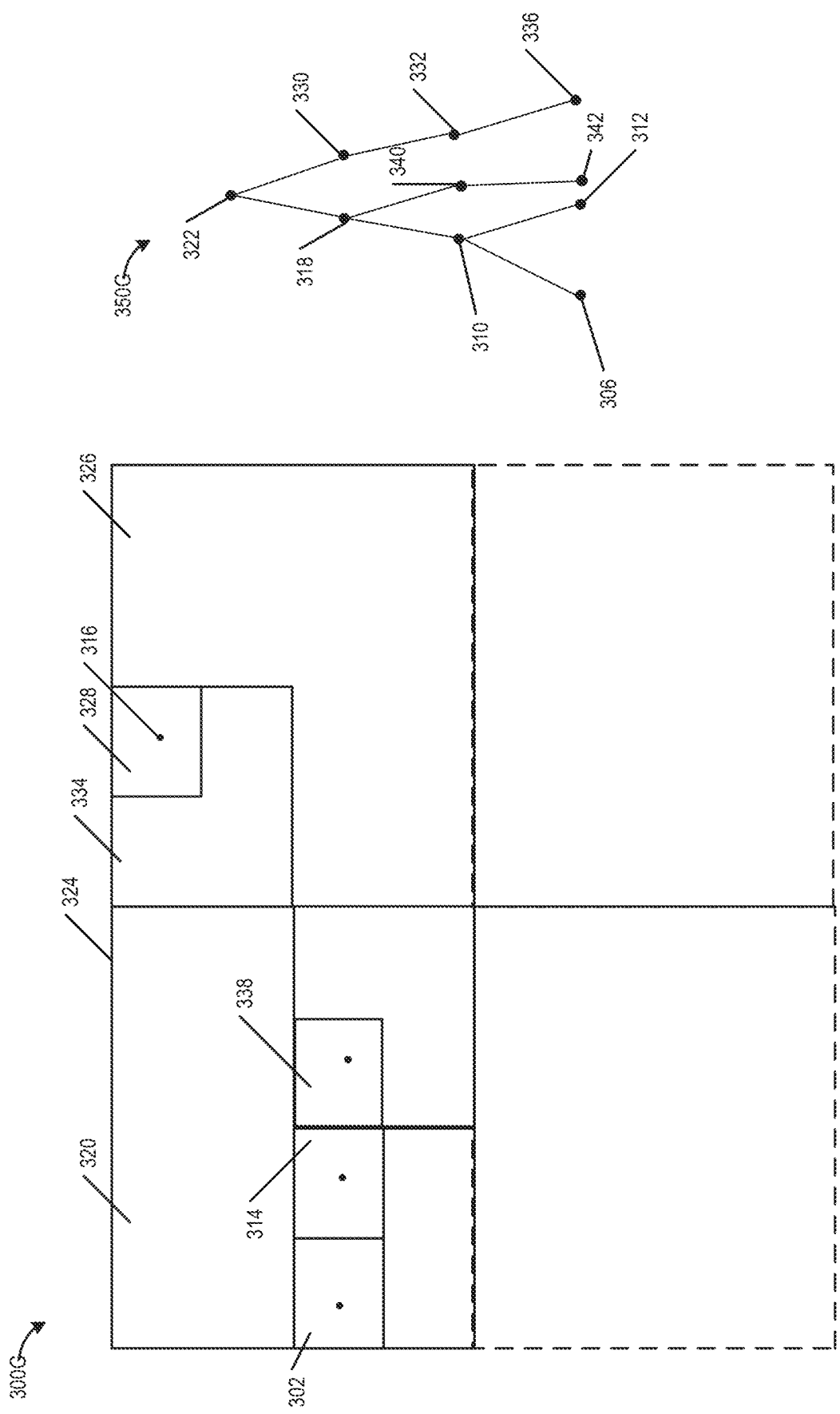

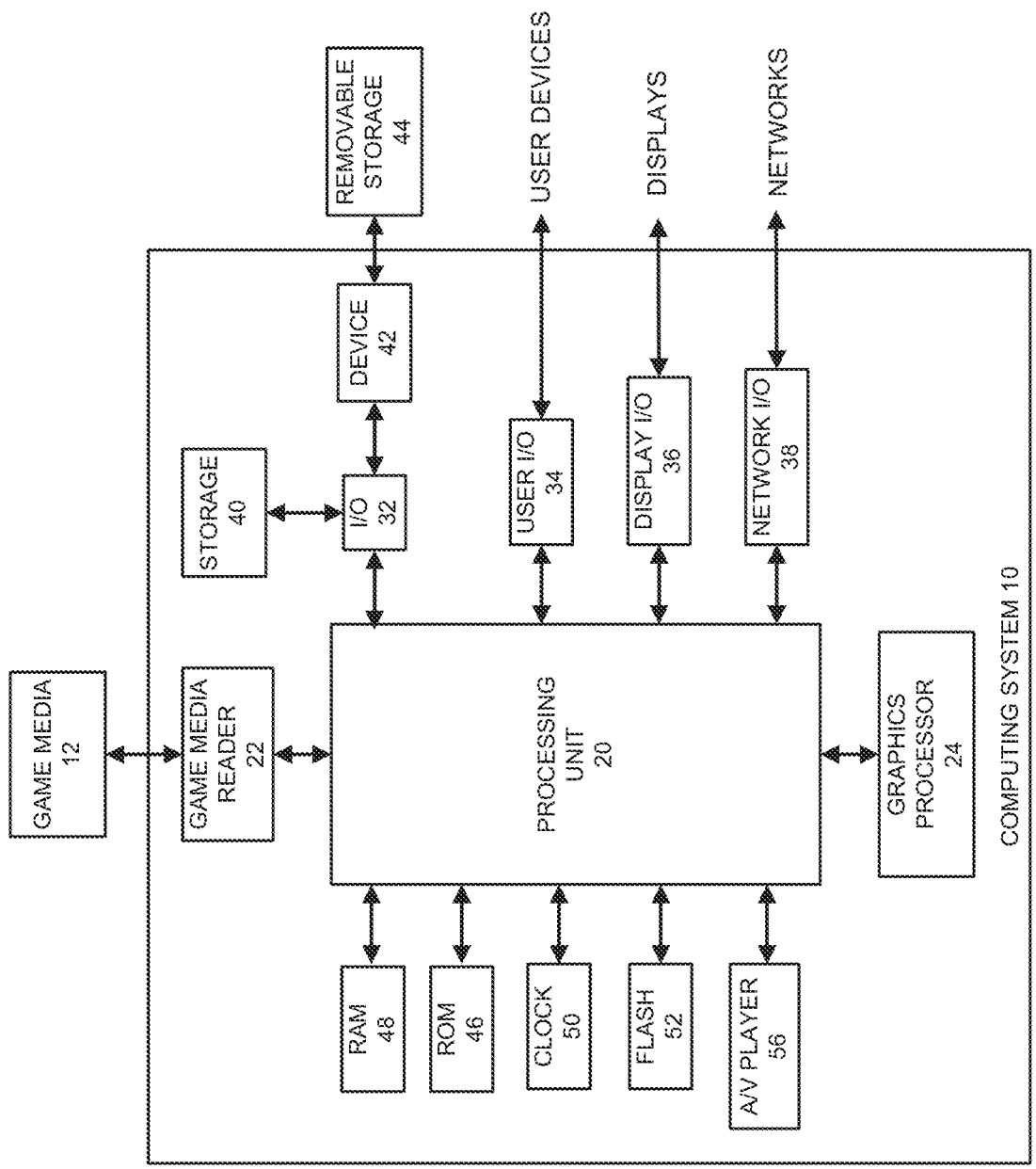

SPATIAL PARTITIONING FOR GRAPHICS RENDERING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Many video games are complex software applications that utilize a significant percentage of a computer system's resources. Each year the complexity of many of the latest video games pushes the boundaries of the latest computing systems. Modern video games comprise millions of lines of code. Testing the code of such large applications can be a time consuming and challenging process. Further, because video games are often programmed by teams of developers, changes made by one developer or team of developers working on one portion of the video game may impact code developed by another developer or team of developers working on another portion of the video game. Ensuring that a video game operates as desired can be particularly challenging when the video game is composed of different modules, which may be created independently, that are configured to operate together to create a single video game or application. Thus, code must often be tested and retested repeatedly as changes are made to the code by different teams.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

Certain aspects of the present disclosure relate to a computer-implemented method. The method may be implemented by one or more hardware processors of a computing system configured with specific computer-executable instructions. The method may include: receiving an initial world definition generated by a level editor, the initial world definition corresponding to a game world of a video game, wherein the initial world definition specifies features of a virtual environment in which the video game is played; spatially partitioning the game world into one or more zones based on the world definition to obtain a zone map of the game world; generating a first reverse quadtree corresponding to the game world based on the zone map; receiving a new zone definition that specifies features of a modification to the virtual environment; and updating the first reverse quadtree based on the new zone definition to obtain a second reverse quadtree without generating a new quadtree.

The method of the preceding paragraph can include any combination or sub-combination of the following features: where the second reverse quadtree maintains at least a portion of the first reverse quadtree; where each of the one or more zones comprise a uniform size and/or shape within the virtual environment; where updating the first reverse quadtree comprises adding to the first reverse quadtree a new leaf node corresponding to a new zone defined by the new zone definition; where adding the new leaf node to the first reverse quadtree generates an intermediate reverse quadtree, and wherein updating the first reverse quadtree further comprises rebalancing the intermediate reverse quadtree to obtain the second reverse quadtree; where updating the first reverse quadtree further comprises adding the new leaf node without rebuilding the first reverse quadtree in its entirety; where the method further comprises determining a view point within the virtual environment; and using the second reverse quadtree, performing one or more graphics rendering operations based at least in part on the view point; where the one or more graphics rendering operations comprise a ray casting operation, a frustum culling operation, or a collision detection operation; where the new zone definition corresponds to a new zone that is external to an outer boundary of the virtual environment; where updating the first reverse quadtree further comprises generating a new root node when the new zone is external to the outer boundary of the virtual environment; updating the first reverse quadtree further comprises forming additional tree structure by iteratively duplicating a leaf structure of the first reverse quadtree until the new zone is encompassed within a resultant reverse quadtree; and where the new zone definition is received based at least in part on an interaction with a user interface configured to interact with the level editor.

Additional aspects of the present disclosure relate to a system comprising an electronic data store configured to store definitions of virtual environments of a video game, and a hardware processor of a game development system in communication with the electronic data store. The hardware processor may be configured to execute specific computer-executable instructions to at least: access a world definition from the electronic data store, the world definition generated by a level editor, the world definition corresponding to a game world of a video game, wherein the world definition specifies features of a virtual environment in which the video game is played; partition the game world into one or more zones based on the world definition to obtain a zone map of the game world; generate a first reverse tree corresponding to the game world based on the zone map, wherein the first reverse tree is built beginning from a leaf node; receive an indication of a modification to the virtual environment; and update the first reverse tree based on the indication of the modification to the virtual environment to obtain a second reverse tree without rebuilding the entirety of the first reverse tree.

The system of the preceding paragraph can include any combination or sub-combination of the following features: where the indication of the modification to the virtual environment comprises a new zone definition that corresponds to a new zone within the virtual environment; where the hardware processor updates the first reverse tree by executing the specific computer-executable instructions to at least generate a new leaf node corresponding to the new zone based at least in part on the new zone definition; where the indication of the modification to the virtual environment comprises a deletion of a removed zone within the virtual environment; where the hardware processor updates the first reverse tree by executing the specific computer-executable instructions to at least remove a leaf node corresponding to the removed zone within the virtual environment from the first reverse tree; where the hardware processor updates the first reverse tree by executing the specific computer-executable instructions to at least rebalance the first reverse tree without the leaf node that is removed to obtain the second reverse tree; where the hardware processor is further configured to execute specific computer-executable instructions to at least: determine a view point within the virtual environment; and using the second reverse tree, perform one or more graphics rendering operations based at least in part on the view point; and where the first reverse tree and the second reverse tree are quadtrees.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIGS. 3A-3G illustrate a conceptual example of spatial partitioning and tree generation during an example level creation in accordance with certain embodiments.

FIG. 6 illustrates an embodiment of a computing system.

DETAILED DESCRIPTION

Introduction

Figure 1A:
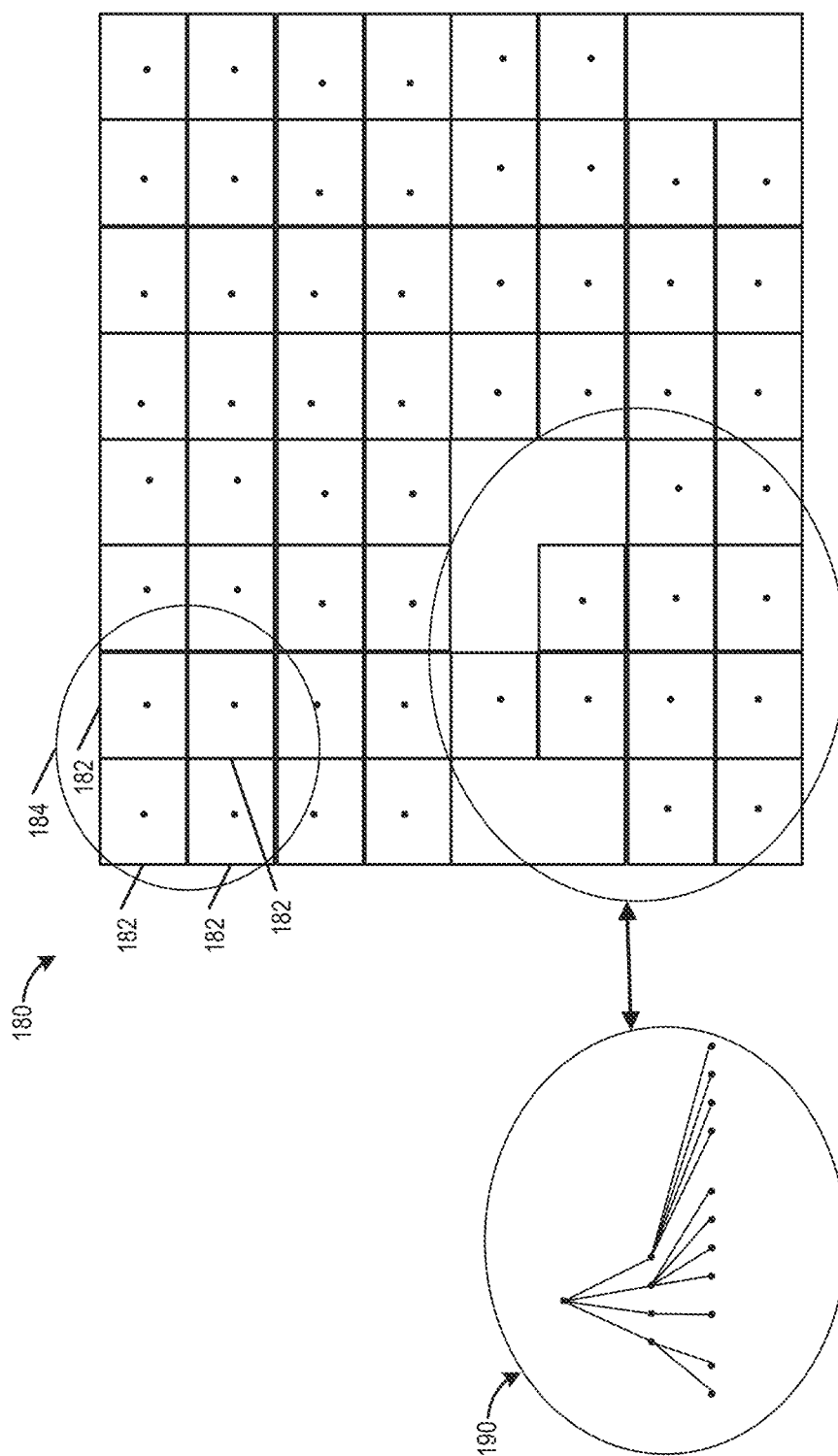
FIG. 1A illustrates a spatial partitioning example that partitions a virtual environment into a set of two-dimensional (2D) squares.

Testing large applications, such as modern video games can be complex and time-consuming. Part of testing video games includes testing the video game world or virtual environment within which the playable and non-playable characters exist and/or interact. Testing the video game world or virtual environment often includes executing a portion of the video game code that renders the virtual environment. This testing may occur not only during a testing process of a playable video game, but may also occur during any stage of development of the video game. For example, during the authoring or development of the video game, a developer may render the virtual environment each time a portion of the virtual environment is created, modified, removed, or otherwise changed. In some cases, the developer may render or initiate rendering of the virtual environment independently from the rest of the video game. For example, the developer may work within a level editor to create and render the virtual environment. In other cases, the developer may cause the virtual environment to be rendered when executing a portion of a video game under test.

Modern video games have increased dramatically in size compared to video games of the past. Further, the size of video games continues to increase. For instance, many massively multiplayer online role-playing games (MMORPGs) correspond to hundreds of square miles in the real world. MMORPGs are not the only types of games that use large virtual environments, but regardless of the type of game virtual environments have increased over time. In many cases, the increase in the size of the virtual environment has outpaced the central processing power and/or graphics processing power of many video game and computing systems.

As indicated above, a developer and/or video game tester can cause a virtual environment, or portion thereof, to be rendered at various times during both the authorizing and testing process of a video game under test. Regardless of how or when the virtual environment is rendered, the increase in the size of the virtual environment increases the amount of computing resources (e.g., graphics processing resources, memory, cache, etc.) required to render the virtual environment. Further, the performance of executing the video game and/or of rendering the virtual environment often suffers or is insufficient for many video games that have large virtual environments.

Each portion of the virtual environment may be defined based on one or more objects within the portion of the virtual environment. Each object may be associated with a pivot point or origin point representing a point of the object where one or more transformations are centered. This pivot point may be the center of the object, or it may be any other point in an object. For example, the pivot point may be some point on a foot of a character.

Objects may include any virtual item or character within the video game. Objects may also be used to compose the virtual environment within a level editor or game engine. An object can be anything that can be in a virtual environment. For example, the object can be a rock, grass, mountains, trees, etc. Further, the object can represent others aspects of the video game, such as a trigger that adjusts volume of sound, or an indication of a direction the sun light is shining. An object may be composed out of several other objects to create a more complex object. For example, a vehicle (e.g., a car) may be an object, but may also contain four wheel objects, an engine object, headlamps objects, and a sound effect object like a horn. Each of these objects may be interacted with via a level editor to create a level or virtual environment. Objects may be created, composed into more complex objects, moved around, or modified via the level editor. For example, the headlamps may be placed up front in the car object, rotated facing forward, and given a particular color for the light that shines from the object (e.g., a playful purple). Objects may have a transform that is centered around the pivot point. The transform may be a translation (which can also be referred to as position), scale or rotation, in the majority of these cases this transform is valid.

To solve some of the above problems, spatial partitioning can be used to divide the virtual environment into different portions or zones. Various graphics processing operations can be performed or simplified using the partitioned virtual environment to reduce the computing resources utilized during execution of the video game. For instance, FIG. 1A illustrates one spatial partitioning example that partitions a virtual environment into a set of two-dimensional (2D) squares. The 2D squares may be rendered separately and/or when something within the square is viewable. The partitioned virtual world 180 may be represented by a tree, such as a quadtree. In a quadtree, each node may have up to four branches that can each branch to another node. The leaf nodes (e.g., squares 182) may represent the smallest portion of the virtual world, intermediate nodes (e.g., set of squares 184) may represent an aggregation of adjacent world portions, and the root node (represented by the outer most square) may represent the entire virtual world. To prevent the drawing from becoming cluttered, not every node is labelled. However, it should be understood that each node may be referenced by label 182 and similarly, groups of squares may be aggregated into intermediate nodes (labelled 184). Further, each intermediate set of nodes may be further aggregated until the root node is reached. The tree 190 represents an alternative equivalent view of the circled portion of the partitioned virtual world 180. Each of the points within the squares 182 represent the pivot point or origin point for the graphical representation of objects within the zone or portion of the virtual environment. These objects may be representative of any item that may be visually represented in the region, such as mountains, grass, trees, rivers, etc. Squares or regions without an object, as indicated by lack of a pivot point, may represent empty or non-existent portions of the virtual environment and are consequently omitted from the array of squares and/or the tree representing the virtual environment.

The use of the spatial partitioning can improve performance of a video game. When a video game is executed, the quadtree can be generated. The quadtree may then be used to facilitate determining portions of the virtual environment to render. Generally, when a video game is published, the size of the virtual world is known, or is known within a particular set of bounds (e.g., user settings, or random within strict or particular bounds set or authored by the developer). Thus, the spatial portioning may be performed once at runtime, or may be stored as a resource with the video game.

However, during the authoring or development process, there is generally no restriction on the size of the virtual environment. Even in cases where the development team has determined a size limit of the virtual environment, developers will often test the virtual environment at different points throughout development when the size of the virtual environment is in flux. Further, design changes may result in changes in the virtual environment. Thus, the process of spatial partitioning and the creation of a quadtree defining the virtual environment may be repeated numerous times. Further, each time a developer adds a new portion of the virtual environment or a new object (represented by square 186) to the virtual environment that is outside the borders of the prior existing virtual environment, a new root node is generated to represent the new virtual environment and the quadtree is recreated so as to represent the entire virtual environment. In other words, the addition of zones or objects (e.g., a new piece of land or a tree) external to the prior existing virtual environment causes the entire partitioning and tree creation process to be repeated adding significant overhead to the rendering process. The repeated performance of spatial partitioning and quadtree creation process may use a lot of processing resources and memory, and can be time intensive when performed repeatedly.

Embodiments of the present disclosure relate to a system configured to perform an improved virtual environment creation and testing process. The system can perform spatial partitioning and a reverse tree generation process. The reverse tree generation process can generate a tree representative of the virtual environment starting from a smallest portion or zone of the virtual environment and expanding up towards a root node representative of the entire virtual environment. Further, in some cases, after reaching the root node, the process may grow the tree in reverse down towards the leaf nodes of the tree to capture portions of the virtual environment not captured in the initial reverse tree generation process. Advantageously, the system disclosed herein can add new zones to the virtual environment and the representative tree data structure that are external to the existing virtual environment without regenerating the tree data structure or generating a completely new tree. Thus, the computing resources utilized by the system disclosed herein may be significantly reduced compared to existing processed while improving the flexibility of the spatial partitioning and tree generation process, thereby enabling spatial partitioning to be performed in real or near real time as a developer authors the virtual environment.

To simplify discussion, the present disclosure is primarily described with respect to a video game. However, the present disclosure is not limited as such and may be applied to other types of applications. For example, embodiments disclosed herein may be applied to educational applications (for example, applications that help users learn a new language), graphical social networking environments, or other applications where many users may simultaneously access the application or where the number of possible actions that a user may perform can be large, such as hundreds, thousands, tens of thousands, some range between the foregoing, or more.

Example Networked Computing Environment

Figure 1B:
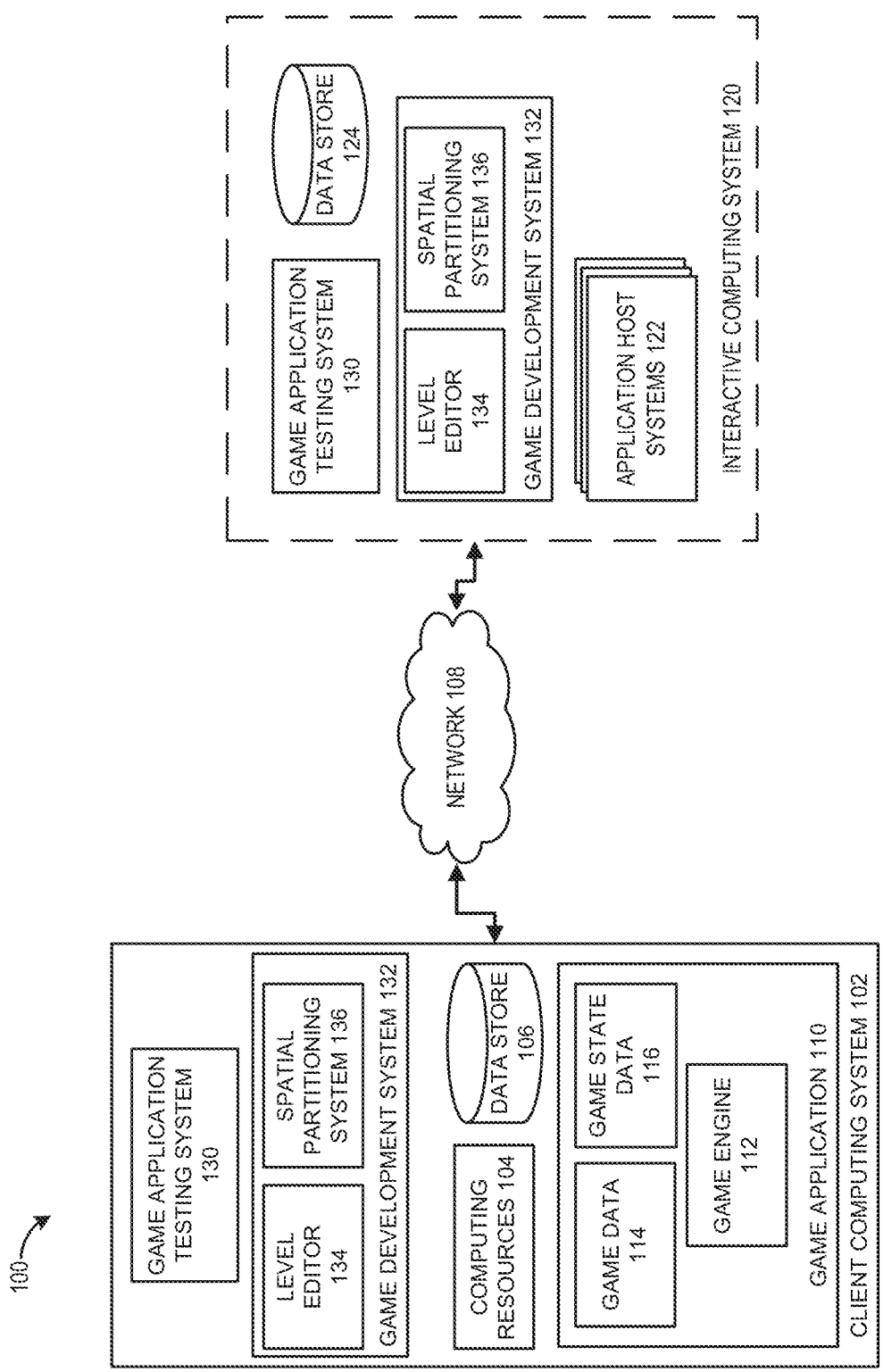
FIG. 1B illustrates an embodiment of a networked computing environment that can implement one or more embodiments of a game development system.

FIG. 1B illustrates an embodiment of a networked computing environment 100 that can implement one or more embodiments of a game development system 132. The environment 100 includes a network 108, a client computing system 102, and an interactive computing system 120. The interactive computing system 120 can include one or more application host systems 122, a data store 124, a game application testing system 130, and a game development system 132. One or more systems of the interactive computing system 120 may be optional or omitted. For example, the game development system 132 may be included as part of the client computing system 102 instead of, or in addition to, being included by the interactive computing system 120.

The client computing system 102 can include computing resources 104, a data store 106, a game application 110, a game development system 132, and a game application test system 130. One or more systems of the client computing system 102 may be optional or omitted. For example, the game application test system 130 may be included as part of the interactive computing system 120 instead of, or in addition to, being included by the client computing system 102.

The game development system 132 may include one or more subsystems that facilitate development of a video game (e.g., the game application 110). The one or more subsystems may include a level editor 134 and a spatial partitioning system 136, among others. Further, although illustrated as subsystems, the level editor 134 and/or the spatial partitioning system 136 may be separate systems.

The game application 110 may include a game engine 112, game data 114, and game state data 116. Further, the game application may be split between the client computing system 102 and the interactive computing system 120. For example, an application host system 122 may host a persistent virtual environment that is part of the game application 110 and the client computing system 102 may host a client portion of the game application 110. Further, the game application 110 may include other types of applications that may include a virtual environment, such as educational software, language learning software, and social networking applications.

To simplify discussion and not to limit the present disclosure, FIG. 1B illustrates only one computing system 102 and one interactive computing system 120, though multiple systems may be used. The client computing system 102 may communicate via a network 108 with the interactive computing system 120. Although only one network 108 is illustrated, multiple distinct and/or distributed networks 108 may exist. The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

Client Computing System

The client computing system 102 includes computing resources 104 and a data store 106. The client computing system 102 may have varied local computing resources 104 such as central processing units and architectures, memory, mass storage, graphics processing units, communication network availability and bandwidth, and so forth. Further, the client computing system 102 may include any type of computing system that can be used to develop, author, program, or otherwise create at least a portion of the game application 110. For example, the client computing system 102 may be a desktop, laptop, video game platform/console, wearable device (for example, smart watches and glasses with computing functionality), and wireless mobile devices (for example, smart phones, PDAs, tablets, or the like), to name a few. Although not shown, a second client computing system may be used to execute a game application 110 under test. This second client computing system may include any type of client computing system 102 that may be used to develop the game application 110. The second client computing system 102 may also include other types of computing systems that may execute the game application 110, but which may not traditionally be used to author the game application 110, such as a television set-top box, television (for example, Internet TVs), network-enabled kiosk, car-console device, computerized appliance. However, in some cases, it may be possible to author a game application 110 on any of the examples disclosed for the second computing system. A more detailed description of an embodiment of a computing system 102 is described below with respect to FIG. 6.

Game Application

The client computing system 102 can include a game application 110 installed thereon. The client computing system 102 can execute the game application 110 based on software code stored at least in part in the data store 106. The game application 110 may also be referred to herein as a video game, a game, game code, or a game program. Moreover, as described above, the game application 110 may include other applications, such as educational applications or social networking applications. A game application 110 should be understood to include software code that a computing device 102 can use to provide a game for a user to play. A game application 110 may include software code that informs a computing device 102 of processor instructions to execute, but may also include data used in the playing of the game, such as data relating to game simulation, presentation, rendering, animation, and other game data. In the illustrated embodiment, the game application 110 includes a game engine 112, game data 114, and game state data 116. When executed, the game application 110 is configured to generate a virtual environment for a user to interface with the game application 110.

The game application 110 may be hosted and/or executed exclusively from a single computing system (e.g., the client computing system 102). Alternatively, or in addition, the game application 110 may be stored or executed in a distributed environment using a client/server architecture. For example, the client computing system 102 may execute a portion of a game application 110 and a server (such as an application host system 122) may execute another portion of the game application 110. For instance, the game application 110 may be a competitive multiplayer online game, such as a battle royale type game, that includes a client portion executed by the client computing system 102 and a server portion executed by one or more application host systems 122. For the present discussion, the game application 110 can execute locally on the client computing system 102 or can execute as a distributed application that includes a portion that executes on the client computing system 102 and a portion that executes on at least one or more application host systems 122.

Game Engine

During operation, the game engine 112 executes the game logic, controls execution of the simulation of gameplay, and controls rendering within the game application 110. In some cases, the game engine 112 controls virtual characters, the environment, execution of the gameplay, how the game progresses, or other aspects of gameplay based on one or more stored rule sets. For example, the game engine 112 can monitor gameplay and detect or determine a current runtime state of the game application 110. Based at least in part on the current runtime state of the game application, the game engine 112 applies a rule set to control the virtual characters or the virtual environment.

In some embodiments, the game engine 112 can control simulation and presentation of a game application 110. Simulation of the game application can generally refer to execution of game logic and control of gameplay simulation. Presentation of the game application can generally refer to execution or presentation of the gameplay and rendering of frames, including the virtual environment. Aspects of the game engine that control simulation will generally be described as being controlled by a simulation engine and aspects of the game engine that control presentation will generally be described as being controlled by a presentation engine. In some embodiments, the game engine 112 can execute the functionality of simulation and presentation using different engines and/or processes within the game application 110.

The simulation engine can control execution of individual virtual components, virtual effects or virtual objects within the game application 110. The simulation engine can manage and determine character movement, character states, collision detection, derive desired motions for characters based on collisions, or the like. Input device(s) allow for user input to be received from the user in order to control aspects of the game application according to rule sets. The simulation engine receives the user inputs and determines character events, such as actions, collisions, runs, throws, attacks and other events appropriate for the game. The character events can be controlled by character movement streams that determine the appropriate motions the characters should make in response to events. The simulation engine can interface with a physics engine that can determine new poses for the characters. The physics engine can have as its inputs, the skeleton models of various characters, environmental settings, character states such as current poses (for example, positions of body parts expressed as positions, joint angles or other specifications), and velocities (linear or angular) of body parts and motions provided by a character movement module, which can be in the form of a set of force/torque vectors for some or all body parts. From this information, the physics engine generates new poses for the characters using rules of physics and those new poses can be used to update character states.

The simulation engine can output graphical state data (e.g., game state data 116) that can be used by the presentation engine to generate and render frames within the game application 110. Graphical state data can be generated for each virtual object that can be used by the presentation engine in the rendering process. The graphical state data can include emitters, lights, models, occluders, terrain, visual environments, and other virtual objects within the virtual environment that can affect the state of the game.

The presentation engine can use the graphical state data to generate and render frames for output to a display within the game application 110. The presentation engine can combine the virtual objects, such as virtual characters, animate objects, inanimate objects, background objects, lighting, reflection, and the like, in order to generate a full scene and a new frame for display. The presentation engine can take into account the surfaces, colors textures, and other parameters of the virtual objects. The presentation engine can then combine the virtual objects (for example, lighting within the virtual environment and virtual character images with inanimate and background objects) to generate and render a frame. During runtime, the game engine can output many frames per second (e.g., 30 FPS, 60 FPS, or any other number of frames per second as determined during execution of the game application).

Game Data

The game data 114 can include rule sets, prerecorded motion capture poses/paths, environmental settings, environmental objects, constraints, skeleton models, route information, or other game application information.

Rule sets can be applied by the game engine 112 to control virtual characters, the virtual environment, execution of the gameplay, how the game progresses, or other aspects of gameplay. The rule sets can define the specific way in which virtual characters (for example, player characters or non-player characters) or the virtual environment behaves or interacts within the video game. For example, the rules sets can correspond to difficulty levels (for example, easy, normal, hard, novice, expert) of a video game. As another example, the rule sets can control a number of resources available to a player, a number of challenges a player must face to progress through the video game, rules for scoring, possible inputs, actions, events, movement in response to inputs, or the like. Further still, for instance in sports-related video games, the rules set can control a degree of skill or ability of a particular virtual player, team, or coach, or can dictate how virtual entities react to particular in-game situations, such as a breakaway attack, defense, or the like. In some cases, rule sets can function as artificial intelligence for computer controlled virtual entities.

The rule sets can be described using the concepts of characters, actions, runtime states, and environments. The virtual character in the video game can be a player controlled character, which is controlled by a user, or a non-player character, which is controlled by the game application, and an action can be a move from a set of all possible moves the character can make. For example, in a hockey game, the character can pass (action A) or shoot (action B) the puck, among other possible actions. A runtime state can be described as a concrete and immediate situation in which the character finds itself. For example, the runtime state can be a specific place and moment, such as an instantaneous configuration that puts the character in relation to other significant things like tools, obstacles, enemies or prizes. A virtual environment can be described as the virtual world through which the character interacts with the game application. In general, a rule or rule set can define a character's way of behaving (for example, the character's actions) at a given time, runtime state, and environment.

At least a portion of the game data 114 can be stored in the data store 106. In some embodiments, a portion of the game data 114 may be received or stored remotely, such as in the data store 124. Game data may be received during runtime of the game application 110. For example, in some cases, one or more rule sets can be received, stored, or applied during runtime of the game application 110.

Game State Information

During runtime of the game application 110, the game application 110 can collect or store game state data 116, which can include a game state, character states, environment states, scene object storage, or information associated with a runtime state of the game application 110. For example, the game state data 116 can identify the state of the game application 110 at a specific point in time, such as a character position, character orientation, character action, game level attributes, and other information contributing to a state of the game application 110. The game state data 116 can include simulation game state data and graphical game state data. The simulation game state data can include game state data that is used by the game engine 112 to execute the simulation of the game application 110. The graphical game state data can include game state data that is generated based on the simulation state data and is used to generate and render frames for output on a display.

Virtual Environment

As used herein, a virtual environment may include a simulated environment (for example, a virtual space or virtual world) instanced on a client computing system 102 and/or a server (e.g., the interactive computing system 120 and/or an application host system 122) that is accessible by a client (for example, client computing system 102) located remotely from the server, to format a view of the virtual environment for display to a user of the client. The simulated environment may have a topography, express real-time interaction by the user, or include one or more objects positioned within the topography that are capable of locomotion within the topography. In some implementations, the topography may be a two-dimensional topography. In other instances, the topography may be a three-dimensional topography. In some implementations, the topography may be a single node. The topography may include dimensions of the virtual environment, or surface features of a surface or objects that are "native" to the virtual environment. In some implementations, the topography may describe a surface (for example, a ground surface, mountains, hills, valleys, etc.) that runs through at least a substantial portion of the virtual environment. In some implementations, the topography may describe a volume with one or more bodies positioned therein (for example, a simulation of gravity-deprived space with one or more celestial bodies positioned therein). Further, the virtual environment may include one or more objects that serve as background or scenery (e.g., trees, shrubs, buildings, bodies of water, alien structures, etc.), which the user may or may not interact with using a playable character. A virtual environment may include a virtual world, but this is not necessarily the case. For example, a virtual environment may include a game space that does not include one or more of the aspects generally associated with a virtual world (for example, gravity, a landscape, etc.). By way of illustration, the well-known game Tetris may be formed as a two-dimensional topography in which bodies (for example, the falling tetrominoes) move in accordance with predetermined parameters (for example, falling at a predetermined speed, and shifting horizontally or rotating based on user interaction).

The game instance of the video game 110 may include a simulated virtual environment, for example, a virtual environment that is accessible by users via clients (for example, client computing system(s) 102) that present the views of the virtual environment to a user. The virtual environment may have a topography, express ongoing real-time interaction by one or more users or include one or more objects positioned within the topography that may (e.g., animals, vehicles, non-player characters, etc.) or may not (trees, shrubs, buildings) be capable of locomotion within the topography. In some instances, the topography may include a two-dimensional topography. In other instances, the topography may include a three-dimensional topography. The topography may include dimensions of the space or surface features of a surface or objects that are "native" to the space. In some instances, the topography may describe a surface (for example, a ground surface) that runs through at least a substantial portion of the space. In some instances, the topography may describe a volume with one or more bodies positioned therein (for example, a simulation of gravity-deprived space with one or more celestial bodies positioned therein). The instance executed by the computer components may be synchronous, asynchronous, or semi-synchronous.

It should be understood that the above description of the manner in which the state of the virtual environment is associated with the video game is not intended to be limiting. The game application 110 may be configured to express the virtual environment in a more limited, or richer, manner. For example, views determined for the video game representing the game state of the instance of the video game may be selected from a limited set of graphics depicting an occurrence in a given place within the video game. The views may include additional content (for example, text, audio, pre-stored video content, or other content) that describes particulars of the current state of the place, beyond the relatively generic graphics. For example, a view may include a generic battle graphic with a textual description of the opponents to be confronted. Other expressions of individual places within the video game are contemplated.

The game engine 112 generates game state data 116 that may be used locally within the game application 110 and may be transmitted to the interactive computing system 120 over network 108. The execution of the instance of the game application 110 may include determining a game state associated with the game application 110. The game state data 116 may facilitate presentation of views of the video game to the users on the client computing system(s) 102. The game state data 116 may include information defining the virtual environment in which the video game is played. The execution of the game engine 112 is described in further detail herein.

The execution of the game instance may enable interaction by the users with the game application 110 or other users through the interactive computing system 120. The game application 110 may be configured to perform operations in the game instance in response to commands received over network 108 from client computing system(s) 102. In some embodiments, users may interact with elements in the video game 110 or with each other through the video game 110.

Users may participate in the video game through client game applications 110 implemented on client computing system(s) 102 associated with the users. Within the game instance of the video game executed by the game engine 112, the users may participate by controlling one or more of an element in the virtual environment associated with the video game. The user-controlled elements may include avatars, user characters, virtual environment units (for example, troops), objects (for example, weapons, horses, vehicle and so on), simulated physical phenomena (for example, wind, rain, earthquakes, or other phenomena), or other user-controlled elements.

The user-controlled character avatars may represent the users in the virtual environment. The user characters may include heroes, knights, commanders, leaders, generals or any other virtual environment entities that may possess strength, skills, abilities, magic powers, knowledge, or any other individualized attributes. The virtual environment units controlled by the user may include troops or any other game entities that may be trained, recruited, captured, or otherwise acquired by the users in groups or en masse. The objects controlled by the users may include weapons, vehicles, projectiles, magic items, wardrobes, boots, armor, knapsacks, medicine, healing potion, or any other virtual items that may be employed by the users for interaction within the video game.

The user-controlled element(s) may move through and interact with the virtual environment (for example, user-virtual environment units in the virtual environment, non-user characters in the virtual environment, other objects in the virtual environment). The user controlled elements controlled by or associated with a given user may be created or customized by the given user. The user may have an "inventory" of virtual goods or currency that the user can use (for example, by manipulation of a user character or other user controlled element, or other items) within the virtual environment.

Controls of virtual elements in the video game may be exercised through commands input by a given user through client computing system(s) 102. The given user may interact with other users through communications exchanged within the virtual environment. Such communications may include one or more of textual chat, instant messages, private messages, voice communications, or other communications. Communications may be received and entered by the users via their respective client computing system(s) 102. Communications may be routed to and from the appropriate users through server(s).

Execution or performance of the user action by the game engine 112 may produce changes to the game state, which may reflect progresses or results of the user actions. In some examples, state changes caused by the execution of the user actions may be recorded in the data store 106 or data store 124 to facilitate persistency throughout the instance of the video game. In some examples, execution of the user actions may not produce persistent changes to the game state (for example, a user character jumping forward and backward successively may not produce any perceivable game state changes to other users).

A given user may input commands with specific parameters to undertake specific deeds, actions, functions, spheres of actions or any other types of interactions within the virtual environment. For example, the given user may input commands to construct, upgrade or demolish virtual buildings; harvest or gather virtual resources; heal virtual user-controlled elements, non-player entities or elements controlled by other users; train, march, transport, reinforce, reassign, recruit, or arrange troops; attack, manage, create, demolish or defend cities, realms, kingdoms, or any other virtual environment locations controlled by or associated with the users; craft or transport virtual items; interact with, compete against or along with non-player entities or virtual environment elements controlled by other users in combats; research technologies or skills; mine or prospect for virtual resources; complete missions, quests, or campaigns; exercise magic power or cast spells; or perform any other specific deeds, actions, functions, or sphere of actions within the virtual environment. In some examples, the given user may input commands to compete against elements in an environment within the virtual environment—for example, Player vs. Environment (PvE) activities. In some examples, the given user may input commands to compete against each other within the virtual environment—for example, Player vs. Player (PvP) activities.

The instance of the video game may include virtual entities automatically controlled in the instance of the video game. Such virtual entities may or may not be associated with any user. As such, the automatically controlled virtual entities may be generated or developed by artificial intelligence configured with the game application 110 or server(s) by a provider, administrator, moderator, or any other entities related to the video game. These automatically controlled entities may evolve within the video game free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server(s). As used herein, such automatically controlled virtual environment entities in the instance of the video game are referred to as "non-player entities."

In an online game, the instance of the video game may be persistent. That is, the video game may continue on whether or not individual users are currently logged in or participating in the video game. A user that logs out of the video game and then logs back in some time later may find the virtual environment or the video game has been changed through the interactions of other users with the video game during the time the user was logged out. These changes may include changes to the simulated physical space, changes in the user's inventory, changes in other users' inventories, changes experienced by non-user characters, or other changes.

Interactive Computing System

The interactive computing system 120 can include one or more application host systems 122, a data store 124, a game application testing system 130, and, optionally, a game development system 132. The interactive computing system 120 may include one or more computing systems configured to execute a portion of the game application 110. In some embodiments, the one or more application host systems 122 can include one or more computing devices, such as servers and databases that may host and/or execute a portion of one or more instances of the game application 110. In certain embodiments, instead of or in addition to executing a portion of the game application 110, the application host systems 122 may execute another application, which may complement and/or interact with the application 110 during execution of an instance of the application 110. The interactive computing system 120 can include one or more data stores 124 that are configured to store information associated with game applications hosted by the interactive computing system 120 and/or the application host systems 122. This information may be user account information and/or data that facilitates execution of the game application 110 (e.g., game data including virtual environment data).

Application Host System

The interactive computing system 120 may enable multiple users or computing systems to access a portion of the game application 110 executed or hosted by the interactive computing system 120. In some embodiments, the portion of the game application 110 executed by application host systems 122 of the interactive computing system 120 may create a persistent virtual world. This persistent virtual world may enable one or more users to interact with the virtual world and with each other in a synchronous and/or asynchronous manner. In some cases, multiple instances of the persistent virtual world may be created or hosted by the interactive computing system 120. A set of users may be assigned to or may access one instance of the persistent virtual world while another set of users may be assigned to or may access another instance of the persistent virtual world. In some embodiments, the host application system 122 may execute a hosting system for executing various aspects of a game environment. For example, in one embodiment, the game application 110 may be a competitive game, such as a first person shooter or sports game, and the host application system 122 can provide a dedicated hosting service for hosting multiplayer game instances or facilitate the creation of game instances hosted by client computing devices. In some embodiments, the host application system 122 can provide a lobby or other environment for users to virtually interact with one another. Such environments may include environments for conducting transactions between players, such as an auction house or other type of environment for facilitating transactions.

Game Application Testing System

The game application testing system 130, which can be hosted by the client computing system 102 and/or the interactive computing system 120, can communicate with other systems to provide and automate acquiring data associated with a game application and analyzing the data. The game application testing system 130 can include one or more systems for data acquisition and analysis. For example, the game application testing system 130 can include a memory monitoring system that monitors memory usage, a processor monitoring system that monitors central processor or graphics processor usage, a glitch detection system that monitors or identifies graphical glitches during development of a game application, or any other system that can facilitate testing a video game 110 under development. Some non-limiting examples of a glitch detection system that can be used with certain embodiments disclosed herein are described in U.S. application Ser. No. 17/017,585, filed on Sep. 10, 2020 and titled "GLITCH DETECTION SYSTEM," the disclosure of which is hereby incorporated by reference in its entirety here.

The example systems that may be included as part of the game application testing system 130 are not intended to be limiting, and the game application testing system 130 may include fewer or more systems than described. In some embodiments, the game application testing system 130 may include more systems and/or functionalities that facilitate the acquisition of game data and the analysis of a game application.

The game application testing system 130 and its various systems may be distributed across multiple computing systems. The various systems of the game application testing system 130 can communicate with each other to obtain and analyze data associated with a game application. For example, a game console may acquire glitch data and communicate the acquired glitch data to the game application testing system 130.

Game Development System

The game development system 132 can be hosted by the client computing system 102 by the interactive computing system 120, or by a combination of the two. The game development system 132 can include any system that is used to code, author, develop, or otherwise create the game application 110. For example, the game development system 132 can include an integrated development environment (IDE), such as NetBeans, Eclipse, Visual Studio, Lazarus, or any other IDE. Further, the game development system 132 can include or use one or more game engines to facilitate game development. For example, the game development system 132 may include the Frostbite engine, Ignite engine, Unreal Engine, or any other game engine.

Different aspects of the video game 110 may be created using different development tools. These tools may be provided by the selected engine (e.g., Frostbite), by the IDE (e.g., Visual Studio), may be created for the game under development, or may otherwise be available for development of the game application 110. One such tool that may facilitate development of the game application 110 is a level editor 134.

The level editor 134 can include any tool that enables the developer to build a virtual environment. The level editor 134 may include one or more building blocks that include graphics, state information, placement rules, and other data that may facilitate the creation of the virtual environment. Further, the data generated by the level editor may further facilitate the determination of interactions between the virtual environment and other objects, including playable objects or characters, within the game application 110 For example, the state information included as part of the virtual environment building blocks may correspond, at least in part, to how a playable character reacts when within the portion of the virtual environment created from a particular building block. For instance, the building blocks may have different associated friction or gravity states that affect a character walking or otherwise within a portion of the virtual environment formed from the building blocks.

Although referred to as a level editor 134, it should be understood that the level editor 134 can both be used to create the environment for particular levels within the game application 110, and also to create the entire virtual environment as one virtual world, or as a plurality of virtual worlds accessible by a user playing the game application 110. The level editor 134 may provide blocks that the developer can drag around to form the virtual world. Further, the level editor 134 may provide a graphical and/or text-based interface that enables the developer to modify one or more characteristics or states of the blocks used to form the virtual environment, or the characteristics or states of the virtual environment itself. In some cases, the level editor 134 enables the user (e.g., the developer) to modify or create portions of the virtual environment while the game application 110 is executing.

The game development system 132 can compile and execute the video game 110 under development. Compiling and executing the video game 110 under development can include rendering the virtual environment created using the level editor 134 and/or presenting the virtual environment to a user (e.g., developer). One or more graphics rendering operations may be performed as part of the process of generating and displaying the virtual environment. In some cases, the rendering and displaying of the virtual environment may be performed by the game application testing system 130 as part of a formal (e.g., scheduled game testing) or informal (e.g., developer exploring or testing different features or changes to the virtual environment during development) testing process.

As previously explained, rendering a large virtual environment can be time consuming. Often a video game is designed with a goal of rendering between 30-60 frames per second. To accomplish this speed, a number of optimizations and tools are used speed up rendering of the virtual environment prior to publishing or shipping a video game. However, during authoring or development of the video game, these rendering optimizations or tools may not be available. In some cases, some of the causes of the delayed or slower rendering time relate to tools that are used to help create the video game and thus, cannot be removed during development. Data and metadata relating to the development tools are generally removed from the video game prior to release.

Thus, rendering time for a virtual environment of a video game under development can be time consuming. For example, a large virtual environment (e.g., one that has 500 thousand or more objects that may be used to form any number of regions, or instances of a minimum or defined size region within the virtual environment) may take up to 400 ms per frame for the level editor 134 to render for a system that is not implementing the spatial partitioning and reverse quadtree features of the present disclosure. Although rendering time during video game development is typically slower than the rendering time achieved when the video game is published, a rendering time of 400 ms per frame is unacceptable as, for example, the slow rendering time makes it difficult for a developer or tester to observe gameplay as the developer or tester explores the virtual environment. Further, a rendering time of 400 ms per frame makes the authoring process unacceptably slow casing wasted time and resources.

Further, a video game environment may be formed from multiple layers. For example, the video game environment may have an underlying land layer, a moisture or water layer, a cloud layer, a physics layer that defines the natural physics (e.g., gravity, springiness, etc.) of the underlying land or surface, and any other type of layer a developer may use to separate different aspects of the virtual environment. A developer may desire to render the virtual environment with or without particular layers to test the game application 110. Thus, it is desirable to have both flexibility and speed when rendering the virtual environment to reduce development/test time.

As previously explained, spatial partitioning may be used to reduce rendering time, both during gameplay and during development or testing of the game application 110. The spatial partitioning system 136 can spatially divide the virtual environment into regions of a fixed size. In some cases, the spatial partitioning system 136 can divide the virtual environment into dynamic or disparate sizes. Spatially partitioning the virtual environment improves the performance of various types of spatial queries using during game development and environment rendering. For example, spatial partitioning can improve performing of collision testing, ray casting, and frustum culling, among other operations. Frustum culling is the process or remove objects, such as portion s of the virtual environment, that exist completely outside of the point of view (e.g., the viewing frustum) of an observer (e.g., the player) viewing the virtual environment. For example, frustum culling may be used to remove objects that are beyond the maximum viewable distance as determined by the developer of the game application. As another example, frustum culling may be used to remove objects that are hidden behind other objects.

The spatial partitioning system 136 can generate a tree data structure to represent the partitioned virtual environment. Each leaf node in the tree data structure may correspond to the smallest representative part or region of the virtual environment. The smallest representative region of the virtual environment may be specified by the developer or may be determined by the level editor 134. The smallest representative region may represent any determined size of a portion of the virtual environment. For example, the smallest representative region may represent a square meter in the virtual environment, 5 square meters, 10 square meters (or any other length, area, or volume with the virtual environment), a particular number of blocks, a particular number of pixels, or any other measurement that may be used within the virtual environment.

The root node in the tree data structure may represent the entirety of the virtual environment. Further, intermediate nodes between the root node and the leaf nodes may represent aggregations of the smallest representative regions. In some cases, the tree data structure may be a quadtree where each root or intermediate node (or each non-leaf node) can have up to four leaves or branches. The quadtree data structure may be used to represent a 2D virtual environment. Although much of the present disclosure focuses on a 2D virtual environment, the present disclosure is not limited as such, and it should be understood that embodiments disclosed herein can be extended to additional (or fewer) dimensions (e.g., a 3D virtual environment). For example, the quadtree data structure can be replaced with an octree data structure to represent a 3D virtual environment.

Further, the spatial partitioning system 136 may represent the virtual environment using a reverse quadtree. The reverse quadtree can be built beginning from a single node that represents a portion of the virtual environment, or objects within the portion of the virtual environment. This single node may be both a leaf and root node. The reverse quadtree can be built upwards towards a root node that represents the whole virtual environment. The reverse quadtree can be built up by pairing adjacent representative regions and connecting them to a root node. This process may be repeated with root nodes becoming intermediate nodes. The process is described in more detail below, and a non-limiting example is illustrated in FIGS. 3A-3G. Each node within a spatial partitioning of the virtual environment may have one or more objects that are included in the virtual environment. A node that does not include an object would be removed from the spatial partitioning, or the reverse quadtree.

By using spatial partitioning, the time to render each frame can be reduced substantially. In tests conducted using a virtual environment with 500 thousand game objects, rendering was reduced from 400 ms/frame to 40 ms/frame. Further, by representing the spatially partitioned virtual environment using a reverse quadtree, it is possible for the developer to add, delete, or otherwise modify portions of the virtual environment without rebuilding the tree data structure. This ability to modify the virtual environment without rebuilding the tree data structure both reduces rendering and testing time, and reduces computing resources because, for example, the same memory space may be used for the tree data structure, and processing resources are not required to rebuild the tree freeing up the processor for rendering and testing the virtual environment thereby further reducing testing time.

Example Use Case

Figure 2:
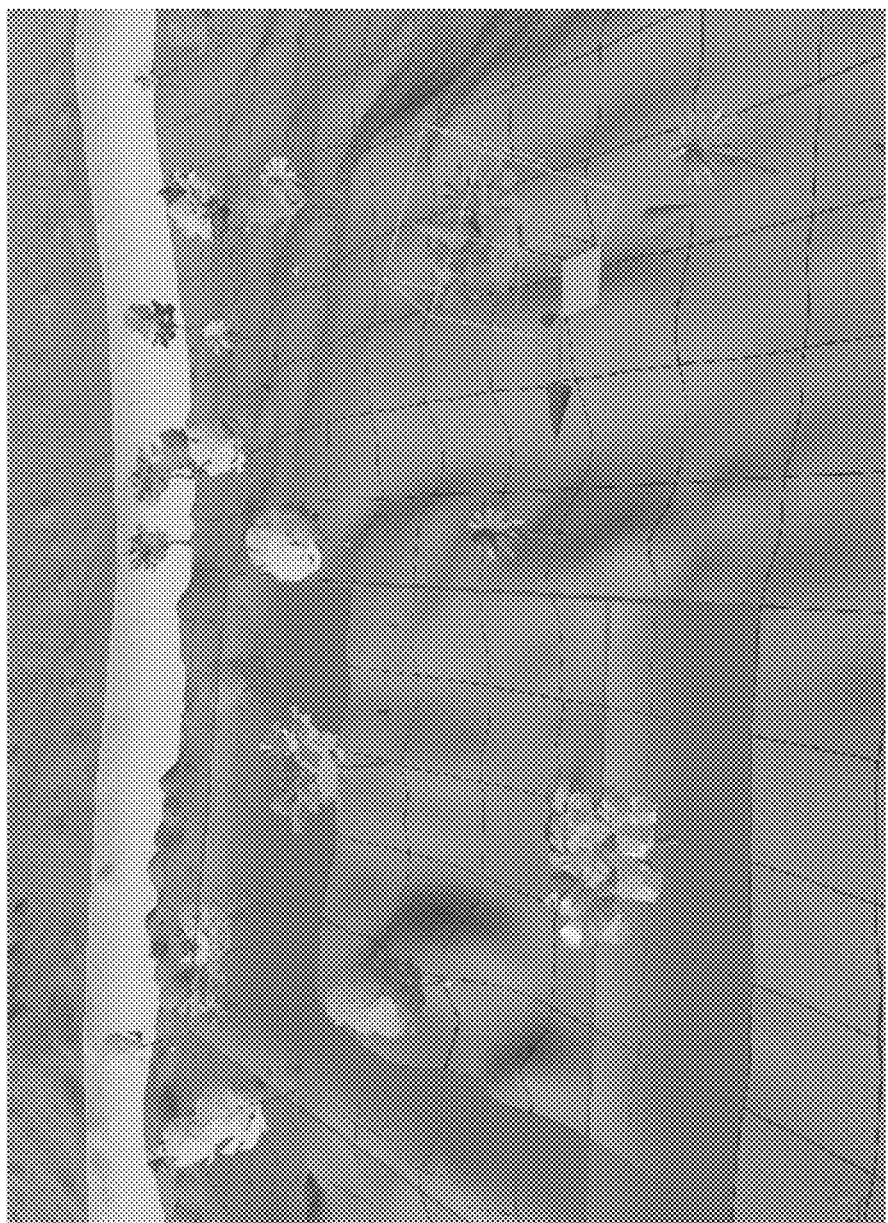
FIG. 2 illustrates an example of a level editing interface in accordance with certain embodiments.

FIG. 2 illustrates an example of a level editing interface 200 in accordance with certain embodiments. The level editing interface 200 may be generated by the level editor 134. A user may access the level editing interface 200 using the client computing system 102 and/or the interactive computing system 120. The level editing interface 200 may include any type of interface that may be generated by the level editor 134 that enables a user (e.g., a developer or virtual environment designer) to create a virtual environment for the game application 110. The level editing interface 200 of FIG. 2 is one non-limiting example of a level editing interface and other level editing interfaces are possible.

As illustrated in FIG. 2, a virtual environment may be divided into blocks, zones, segments, or other units. Each zone may be of a uniform size, or may be of varying sizes. In some cases, zones that are larger than a minimum zone size may be sized to be multiples of the minimum zone size.

Each zone may be of a different type of environment. Further, each zone of the virtual environment may include objects. In the depicted example, the zones include grassland, water, or lava, and the objects are different types of trees. However, it should be understood that the type of zone and the type of objects are not limited and may be determined by the designer of the game application 110.

As illustrated, each zone may be rectangular or square in shape. However, the present disclosure is not limited as such, and zones may be formed from other shapes, such as hexagons.

Example Spatial Partitioning and Tree Generation Use Case

FIGS. 3A-3G illustrate a conceptual example of spatial partitioning and tree generation during an example level creation in accordance with certain embodiments. The FIGS. 3A-3G illustrate a virtual environment being created by a user (e.g., a developer) or an automated process (e.g., a script) in two different forms: as a zone map formed from a set of squares and as a quadtree tree. Because the quadtree is formed in reverse (from leaf to root instead of root to lead), the quadtree may be referred to as a reverse quadtree. The level or virtual environment being processed in FIGS. 3A-3G is illustrated as being performed in real-time as a user creates a virtual environment using the level editor 134 and/or the level editing interface 200 of FIG. 2. However, it should be understood that processes described herein can also be used with respect to existing virtual environments.

In the non-limiting examples of FIGS. 3A-3G, the zone maps 300A-300G of FIGS. 3A-3G represent a single virtual environment during the process of creation and can be referred to collectively as zone map 300 or individually as zone map 300A-300G. Similarly, the quadtrees 350A-350G of FIGS. 3A-3G represent a single quadtree during the process of creation and can be referred to collectively as quadtree 350 or individually as quadtree 350A-300G.

In FIG. 3A, a user (or automated script) has created a game object. The game object may be created by interacting with a level editing interface 200 of a level editor 134. The addition or creation of the game object may trigger the generation of a zone 302. This zone 302 may be created via a script or other authoring tool that generates a zone within the virtual environment in response to the addition of one or more objects within the zone 302. The zone 302 may represent any type of virtual environment, such as land, space, water, a floor in a building, etc. The object may include a pivot point or an origin point 304. This origin point may be at the center of the zone 302, or may be at any other point within the zone 302. Further, although the zone 302 is illustrated as having a single pivot point associated with a single object, it should be understood that the zone 302 may have multiple objects within it that may each be associated with one or more pivot points. Generally, the origin point may include the point at which one or more transformations (e.g., rotations, scaling, translations, etc.) to the object are centered. As illustrated in FIG. 3A, the zone map 300A is made of a single zone 302. Thus, the virtual environment represented by the zone map 300A may consist of a single zone. For example, a single building, a single section of grassland, a single section of space, etc.

The spatial partitioning system 136 may partition the virtual environment into different partitions. In the illustrated embodiments, the partitions formed by the spatial partitioning system 136 correspond to the zones. In other words, the zone 302 may be equivalent to the partition generated by the spatial partitioning system 136. However, it should be understood that the partitions and the created zones may differ. For example, a user may use the level editor 134 to create a single zone of grassland that is 100 feet square within the virtual environment. The single zone of grassland may be adjacent to other zones of grassland, or to zones of different types. Continuing this example, the spatial portioning system 136 may partition the zone of grassland into one spatial partition that is 100 feet square, or into four spatial partitions that are each 25 feet square, or into any other number of partitions. Each of the partitions may be of a minimum partition size, or a multiple of a minimum partition size. In some cases, the minimum partition size matches the smallest zone size. The minimum partition size and/or smallest zone size may be specified by a developer, a coding library or video game engine used by the developer, or may be configured by the level editor 134 and/or spatial partitioning system 136.

The spatial partitioning system 136 may create a reverse quadtree 350A representing the virtual environment and may be an analog of the zone map 300A or may correspond at least in part to the zone map 300A. As the virtual environment corresponding to the zone map 300A is formed from a single zone 302, the reverse quadtree 350A has a single node 306 that is both a leaf node representing the zone 302 and a root node representing the virtual environment corresponding to the zone map 300A. It should be understood that the reverse quadtree 350A is one representation of the virtual environment that may illustratively be depicted as a tree (e.g., 350A) or a set of 2D squares (e.g., zone 302). However, in certain embodiments, the form of the data structure and/or the representation of the virtual environment may differ in visual representation and/or in storage format.

In FIG. 3B, the user has added a new game object that is outside of the portion of the virtual environment of FIG. 3A to form an expanded virtual environment corresponding to the expanded zone map 300B. The zone map 300B includes a new zone with a pivot or origin point 308 associated with the new object. The object included in the new zone may be adjacent to the object included in the zone 302 and may be of the same type or a different type of object as included in the zone 302.

The spatial partitioning system 136 may modify the reverse quadtree 350A to form the reverse quadtree 350B. The spatial partitioning system 136 may form the quadtree in reverse in that the spatial partitioning system 136 begins with the prior root and leaf node 306 and creates a new root node 310 that is then connected via an edge to the existing leaf node 306 that corresponds to the existing zone 302.

In FIG. 3C, the spatial partitioning system 136 performs the spatial partitioning process on the zone map 300C to form or delineate a new partition 314 associated with the zone having an object with the origin point 308. Further, the spatial partitioning system 136 adds a new leaf node 312 corresponding to the new zone or partition 314 to the reverse quadtree to form the reverse quadtree 350C.

Figure 3F:
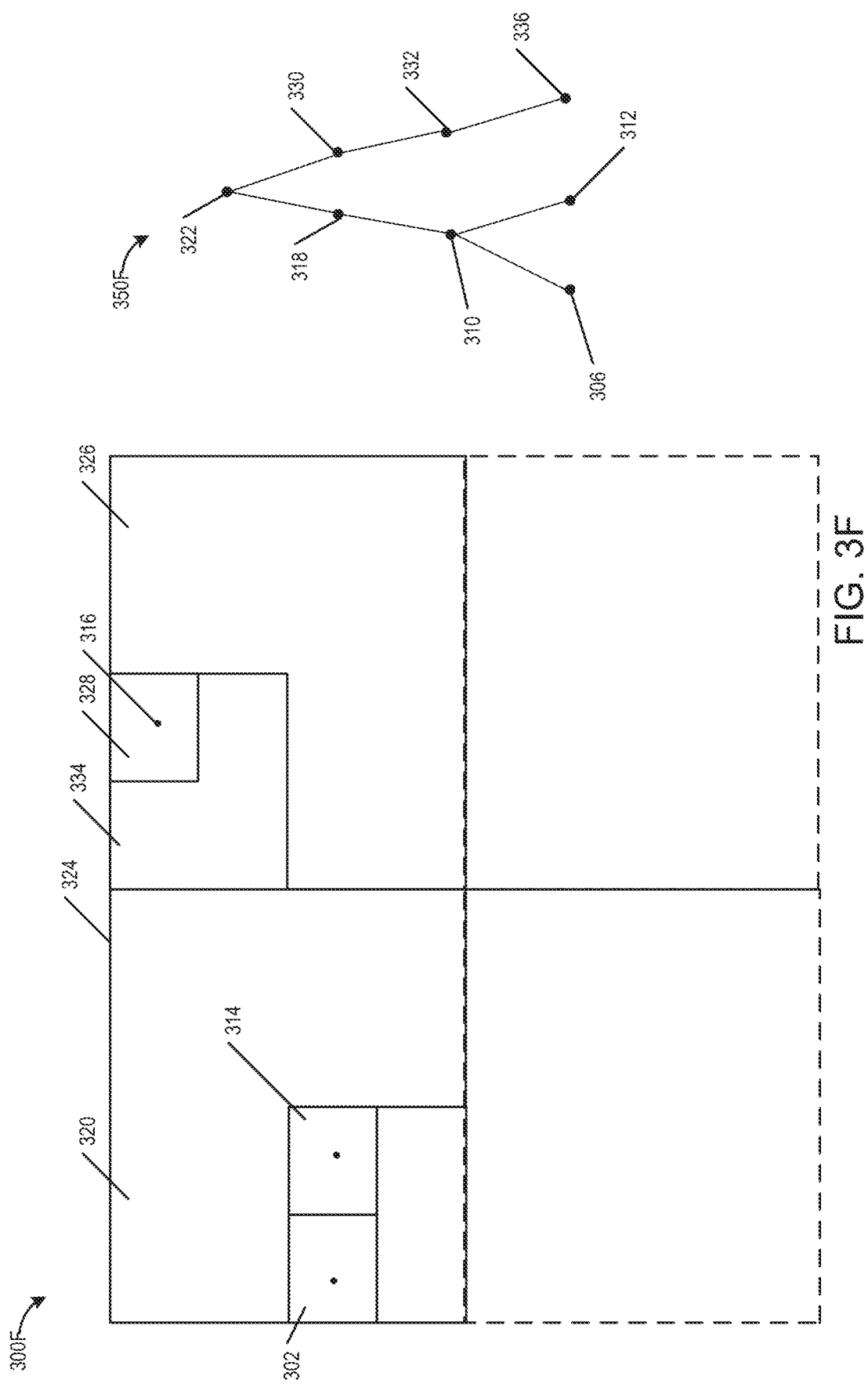

As illustrated by following the FIGS. 3A-3C, the reverse quadtree is formed in reverse order in that the quadtree begins from a leaf node and grows up to a root, before growing back down to encompass any omitted leaf nodes corresponding to additional zones. Advantageously, as illustrated with FIGS. 3D-3F, using a reverse quadtree enables zones, or objects within zones, to be added to the virtual environment corresponding to the zone map 300 that are external to the existing virtual environment or corresponding zone map 300. In contrast, a quadtree built from the root node to the leaf nodes cannot add a node that is external to the fully formed virtual environment (or corresponding tree) without rebuilding the quadtree because, for example, a new root node may be needed to encompass the new leaf node. Rebuilding the quadtree takes more time and uses more computing resources, such as additional memory space to store the newly created tree and additional processing cycles to form the new quadtree. Accordingly, using the reverse quadtree uses less computing resources and reduces rendering time by reducing the time to generate the representative quadtree as the developer modifies or builds the virtual environment.

In FIG. 3D, the user creates a new zone by adding a new object with an origin point 316. Although described as adding a new zone, it should be understood that the user may or may not be aware of the underlying zone and/or partition. Instead, the user may define one or more new objects as part of the virtual environment. The system may then delineate one or more zones and/or partitions based on the position and/or type of objects added to the virtual environment. This new zone with an object having the pivot point 316 is outside of the existing virtual environment and is beyond the space that may be represented by a fully formed quadtree having root node 310. Thus, to encompass the new zone with the origin point 316, a new root node may be formed. Expanding the quadtree 350D by one level adds up to 3 more nodes (for a total of four within a quadtree). The new nodes may be lead nodes, or intermediate nodes that connect to leaf nodes or other intermediate nodes. Each leaf node represents the smallest or minimum supported zone for the virtual environment. To encompass the new zone within the quadtree, the existing zone map 300D may be doubled until the new zone with the origin point 316 is encompassed within a partition of the zone map 300D. Each doubling of the zone map 300D may correspond to a new level (e.g., a new intermediate node) within the reverse quadtree 350D.

In FIG. 3E, the spatial partitioning system 136 adds a new root node 318 to the reverse quadtree 350E. This reverse quadtree 350E may be considered an intermediate reverse quadtree as it has expanded to encompass nodes that will become intermediate nodes as the process continues to repeat until the new zone is encompassed by the tree or zone map. The new root node 318 represents a quadrupling of the zone map 300E and of the potential size of the virtual environment corresponding to the outer square 320 of the zone map 300E. It should be understood that the zone map 300E may not include the entirety of the space represented by the outer square 320. Spaces that omit origin points within the outer square 320 may be empty space within the virtual environment. This empty space may be intentionally unused area (e.g., because the designed world is smaller than the potentially supported world, because the space is reserved for future downloadable content, etc.), it may be area that is still under construction, or may be due to a bug or coding error.

In FIG. 3F, the process described with respect to the FIG. 3E is repeated. The spatial partitioning system 136 adds a new root node 322 to the reverse quadtree 350F. The new root node 322 again represents a quadrupling of the potential size of the virtual environment corresponding to the outer square 324 of the zone map 300F. The previous outer square 320 transitions from a root representing the entire virtual environment to an intermediate node representing a portion (e.g., a quarter of the virtual environment) corresponding to an intermediate node. The intermediate node corresponding to the square 320 is the node 318, which was previously the root node in FIG. 3E. As half of the zone map 300F does not include any zones that have been created by the developer, they are presented by dashed lines to indicate that they do not include content, and the reverse quadtree 350F does not include any corresponding nodes or branches for the empty portions of the zone map 300F.

The zone map 300F now includes the previously added zone with the origin 316. At this point, the spatial partitioning system 136 may partition the new zone 326 that includes the new zone with the origin 316 until a smallest or minimum sized zone corresponding to a leaf node is created that encompasses the zone 328 with the origin point 316. Partitioning the new zone may include and/or may correspond to traversing from the root node 322 down to leaf nodes of the reverse quadtree 350F with the leaf nodes representing the smallest or minimum sized zone. Thus, in the illustrated example in FIG. 3F, a first intermediate node 330 and a second intermediate node 332 are created corresponding to the square or regions 326 and 334, respectively. The second intermediate node 332 then connects to a leaf node 336, which corresponds to the zone 328 that was newly added in FIG. 3D having the origin point 316.

FIG. 3G illustrates the addition of another new zone that is within the zone map 300G. As the new zone is within the existing zone map 300G, a new root node is not needed and the root node of the reverse quadtree remains 322. The new region 338 is placed adjacent to the region 314 in this non-limiting example. The spatial partitioning system 136 may add a new intermediate node 340 that links to intermediate node 318. The spatial partitioning system 136 may then add a new leaf node 342 corresponding to the new zone 338 to the intermediate node 340. The process of adding a new root node and/or intermediates nodes as new regions are added to the virtual environment may result in rebalancing the reverse quadtree such that the leaf nodes are maintained at the same level within the quadtree. In the example of FIG. 3G, the tree is a 4-level tree with each of the leaf nodes representing the smallest or minimum regions supported by the zone map 300G being at the fourth or lowest level.

As explained above, when a new object is added outside of the existing virtual environment, a new root node may be generated. In certain embodiments, each child node of a particular node may be associated with a particular edge that connects to the node. Each of these edges may be labelled. For example, assuming a top down approach as if one were looking at a map, the four child nodes or edges connected the child nodes may be labelled or named as NE, NW, SE, and SW. A root node may have an undecided position as it would be relative to a potential new root. When a re-rooting process is performed to accommodate a new object outside of the existing virtual environment, a new root may be generated. A normalized vector between the center point of the original root of the existing virtual environment and the new object may be calculated as vDir. The inverse of vDir may be determined and may represent the original root node's position relative to the new root node. The new root node's center position may represent the original root node's corner inverse of the original root node's position. For example, if the original root node's position becomes SE, the NW corner of the original root is the position of new root. These steps may be repeated until the new object is encapsulated in a root node.

Many times a user (e.g., a developer, a tester, or other user involved in the development of the game application 110) will move around a portion of a world or virtual environment during development or testing of the game application 110. The portion of the virtual environment moved may be relatively small (e.g., a single object) or large (e.g., 100, 250, 500 objects, etc.) For example, the user may move a single tree, stone, light source, gravity well, etc. Alternatively, or in addition, the user may move a forest with many trees, a city with many buildings, a dungeon, etc. Regardless of the size of the portion of the virtual environment moved around, the operation may be performed as a single operation. Thus, in the case of a large number of objects being moved, the move operations may be batched together as a single operation enabling the spatial partitioning and reverse quadtree generation to be performed once for the entire batch of move operations. By performing the spatial partitioning and reverse quadtree generation once, the performance of multiple re-roots or root modification of the quadtree can be avoided reducing the computing resources utilized compared to processing a single operation at a time. The single re-rooting operation can be performed by finding an edge or boundary of the portion of the virtual environment being moved and performing the reverse quadtree modification process described above. For example, suppose that a forest is being moved (e.g., a translation operation is being performed) to the opposite side of a lake. The game development system 132 can determine the position of each of the trees in the forest being translated. The game development system 132 can build a bounding box that encapsulates all of the trees in the forest. A corner of the bounding box furthest away from the existing root may be identified and a re-rooting operation may be performed as described above. Performing the re-rooting process starting with the farthest corner of the bounding box can ensure that the whole forest will eventually be within a partition. Although the process may require more than one re-root, it will generally require less re-root operations than performing the process for each individual tree.

Further, the larger the virtual environment becomes, the less frequent re-root operations are performed. Moreover, the larger the virtual environment is, the larger the root will be resulting in a reduced probability of performing multiple re-root operations.

In certain embodiments, most of the visual objects, (e.g., something that has a visual representation, such as a rock, as opposed to something that may exist in the game, but may not be visible, such as a gravity well) have a mesh and/or a texture. For example, a tree may have a texture. And complex objects, such as a car, may have several textures and/or meshes. In some such cases, the spatial partitioning process accounts for the different textures and component objects that form an object by using both a strict and loose bounding box concept around the object. For example, when dealing with a large object like multi-story building, determining if the building is visible based only on its position may be insufficient because, for example, the origin or pivot of the building may be out of view, e.g., outside the frustum, but the corner of the building might still be visible. By considering both a strict and a loose bounding box for the object, its possible to determine if a portion of the building may still be in view using the spatial partitioning process and re-rooting processing described herein.

The leaf nodes of the reverse quadtree 350G may store any information that may define a corresponding zone of the virtual environment or otherwise facilitate drawing or rendering a zone. For example, the leaf nodes may include sprites, texture information, physics information, relative positioning, included objects, shading information, lighting information, or any other information that may help render the corresponding portions of the virtual environment. Moreover, the virtual environment may be built with different layers. For example, there may be an object layer that specifies the objects in each zone, a texture layer that specifies textures on the objects, a physics layer that specifies how the zones should react when interacted with (e.g., gravity, springiness, breakability, etc.), or any other type of layer that may be used configure an aspect of the virtual environment. Each of these layers may have information that are stored as part of the leaf nodes to facilitate performing one or more graphics rendering operations.

Alternatively, each of the leaf nodes of the reverse quadtree 350G may hold one or more pointers or otherwise store one or more addresses of the one or more objects included in a zone represented by the leaf node. The object or address location may include any information associated with the object including the information described in the previous paragraph with respect to the leaf nodes. For example, the object and/or address location may include sprites, texture information, physics information, relative positioning, included objects, shading information, lighting information, or any other information that may help render the corresponding portions of the virtual environment and/or the objects within the virtual environment.

Example Graphics Rendering Use Cases

Figure 4A:
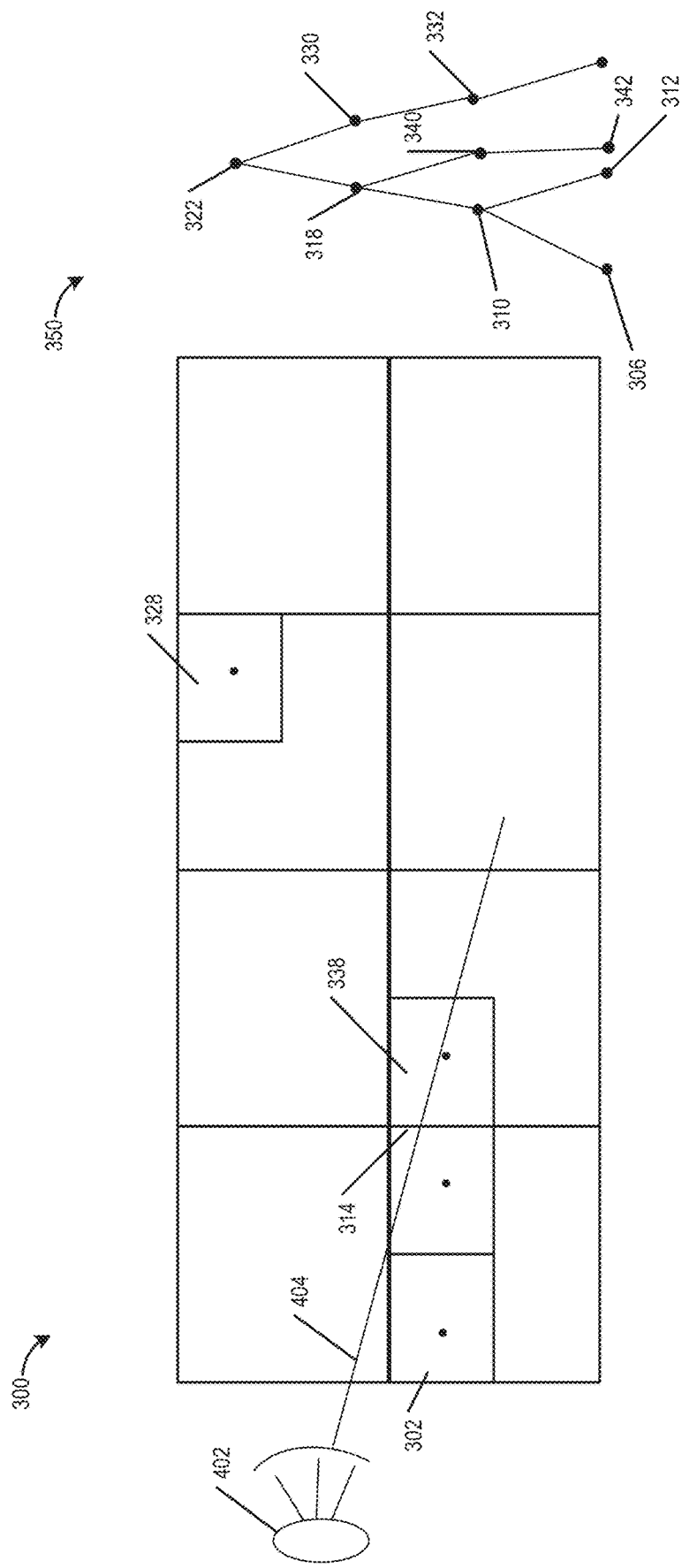
FIGS. 4A and 4B illustrate examples of applying a pair of graphics rendering related operations to the virtual environment created in FIG. 3G in accordance with certain embodiments.
Figure 4B:
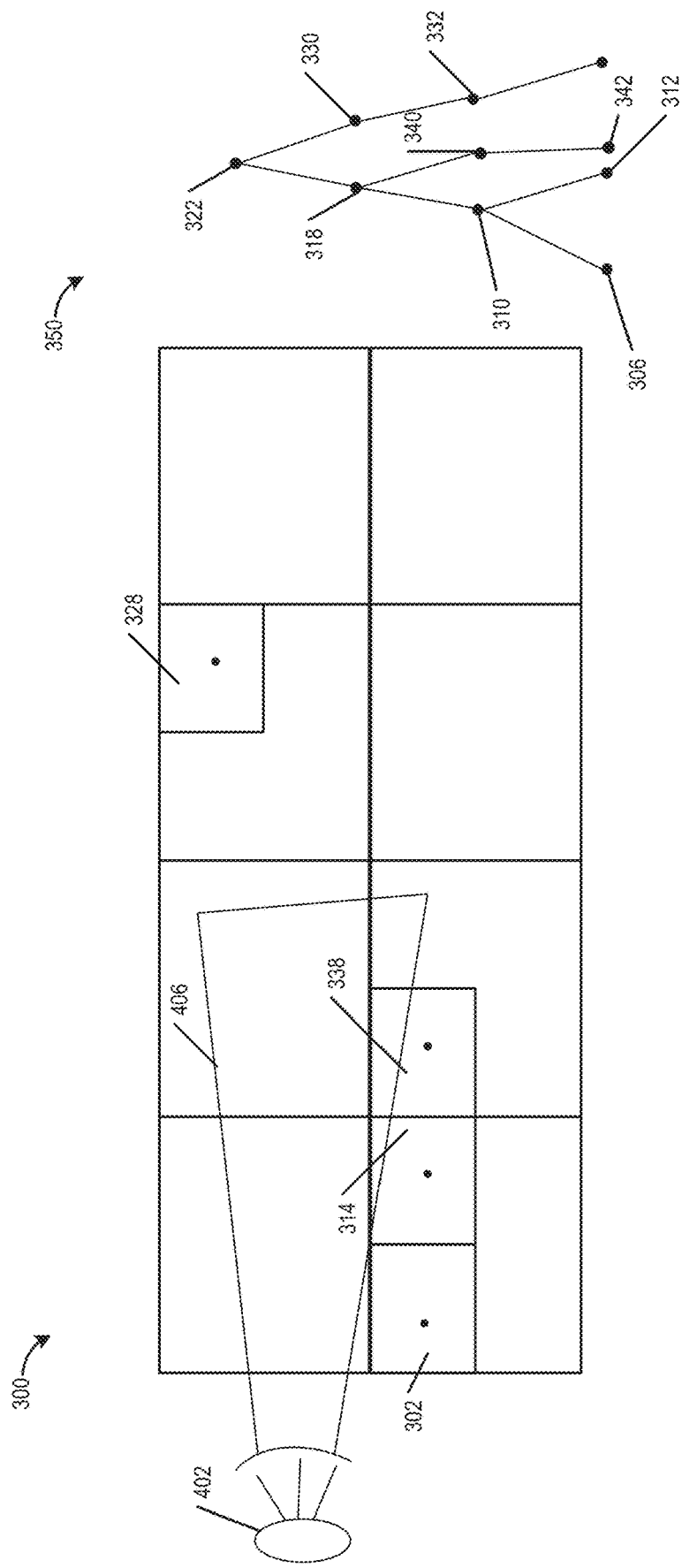

FIGS. 4A and 4B illustrate examples of applying a pair of graphics rendering related operations to the virtual environment created in FIG. 3G in accordance with certain embodiments. The representation of the spatially partitioned virtual environment (which may be represented by the zone map 300 and/or the reverse quadtree 350) can be used to facilitate rendering the corresponding virtual environment more faster, efficiently, and using less computing resources, which is advantageous during development of the game application 110 when the virtual environment may be render numerous times as part of the development and/or testing process for the game application 110. In some embodiments, the game development system 132 and/or the game application testing system 130 can render the virtual environment using the zone map 300 representation of the spatially partitioned virtual environment and/or the reverse quadtree 350.

FIG. 4A illustrates an example of a ray casting operating that may be performed during rendering of the virtual environment corresponding to the zone map 300. The ray casting operation may be performed by computing resource 104 (e.g., a graphics card) in response to execution of the game application 110 under test or development by the game application testing system 130 and/or by the game development system 132. Ray casting may include determining a first object that is intersected by a ray that extends from or is cast by an eye representing a view point of the eye. The use of ray casting can help identify what objects a user would see and what objects might be hidden and therefore, not need to be rendered (e.g., hidden surface removal). Further, ray casting can be used to help with collision detection. In some cases, the game application testing system 130, game development system 132, and/or the level editor 134 may use ray casting to select objects to manipulate. The level editor 134 may cast a ray from the eye 402 to the mouse pointer and selecting the first object intersected by the ray. A developer can modify, edit, or otherwise manipulate the selected object as needed in developing the game application 110. For example, if the selected object is unnecessarily blocking view, the developer may shrink or remove the object. As another example, if the selected object is not causing a desired reflectivity, the developer may modify the configuration of the selected object to provide the desired reflectivity.

The eye 402 represents the viewpoint of an observer (e.g., a user, such as a developer or player) viewing the virtual environment corresponding to the zone map 300. The ray 404 represents the line of view of the eye 402. While rendering the virtual environment, the game engine 112, the game application testing system 130, and/or the game development system 132 can determine the zones that will be intersected by the ray 404. Based on the determination of the intersection with the ray 404, it can be determined which zones to render. In the example illustrated in FIG. 4A, the zones 314 and 338 may be determined to be rendered at least in part. In contrast, the zones 302 and 328 may be determined to be omitted from the rendering of the virtual environment. Using the reverse quadtree 350, information about the zones to be rendered can be accessed while zones that are not be rendered can be omitted. Thus, using the reverse quadtree 350, a scene or virtual environment can be rendered more quickly compared to systems that do not use spatial partitioning. Further, as the reverse quadtree can be modified as the virtual environment is modified, the virtual environment can be rendered and tested quicker and using less computing resources.

The use of spatial partitioning simplifies performing graphics rendering operations, such as ray casting, on the virtual environment, or objects within the virtual environment. For example, suppose the game application 110 has a virtual environment representing a long term parking lot at an airport. The parking lot may be 1500 m×500 m and can fit roughly 30 000 cars. In this example, the smallest partition, and consequently the leaf node in the reverse quadtree representing the spatial partitioning of the virtual environment may represent 50 m×50 m of the virtual environment. Further, each leaf node may include roughly 100 car objects. If a ray cast operation is performed parallel to the short side of a rectangle, the ray would at most intersect 10 leaf nodes. Now suppose the view distance is set to 250 m, the ray can be limited to 250 m and now at most the ray intersects 5 leaf nodes. All the cars in (or reference by) the intersected leaf nodes may now be checked against the ray to determine which cars are actually hit by the ray. Although each leaf node may have 100 car objects, the ray may not necessarily intersect all of the cars with an intersected leaf node. Thus, the cars are checked with respect to the ray to determine intersection with the ray. However, cars in leaf nodes that are not intersected by the ray need not be checked thereby reducing processing time during performance of the rendering operation. Thus, with the spatial optimization, a ray vs car intersection check can be performed on 500 cars instead of the whole parking lot of 30,000 cars. This parking lot example demonstrates the advantages of the present disclosure. However, the example is quite small compared to real world video games. For example, in the proof of concept embodiment, 500,000 objects were tested against a relatively large map. And in certain games under development, there are millions of objects within the environment. For example, in one game application under development, there are 500,000 light posts in an area 20×20 km, as well as numerous other objects one might expect to find in a city. Thus, the ability to reduce the size of the virtual environment to be processed using spatial partitioning significantly improves performance and reduces computing resource usage. Moreover, the use of the reverse quadtree enables the ability to grow the virtual environment while maintaining the advantages of the spatial partitioning.

FIG. 4B illustrates an example of a frustum culling operating that may be performed during rendering of the virtual environment corresponding to the zone map 300. Frustum culling is the process of determining everything that may be viewable on a screen and omitting everything that is not at least partially included in the frustum. The frustum shape may depend on the type of camera lens being simulated to produce the image displayed to a user. However, often the frustum is shaped like a rectangular pyramid with the top (representing where the eye is positioned) being cut off, and the base of the pyramid serving as the horizon or the furthest point where the user can see.

As with FIG. 4A, the eye 402 may represent the user's eye, which may look through the frustum 406. Any object (or zone within the virtual environment) that is at least partially located within the viewing frustum may be viewable by the user. Thus, in the illustrated example of FIG. 4B, the zones 314 and 338 may be viewable at least in part, while the zones 302 and 328 are not viewable and can be omitted from the rendering process. Using the reverse quadtree 350, information about the zones to be rendered can be accessed while zones that are not be rendered can be omitted.

Example Virtual Environment Creation Process

Figure 5:
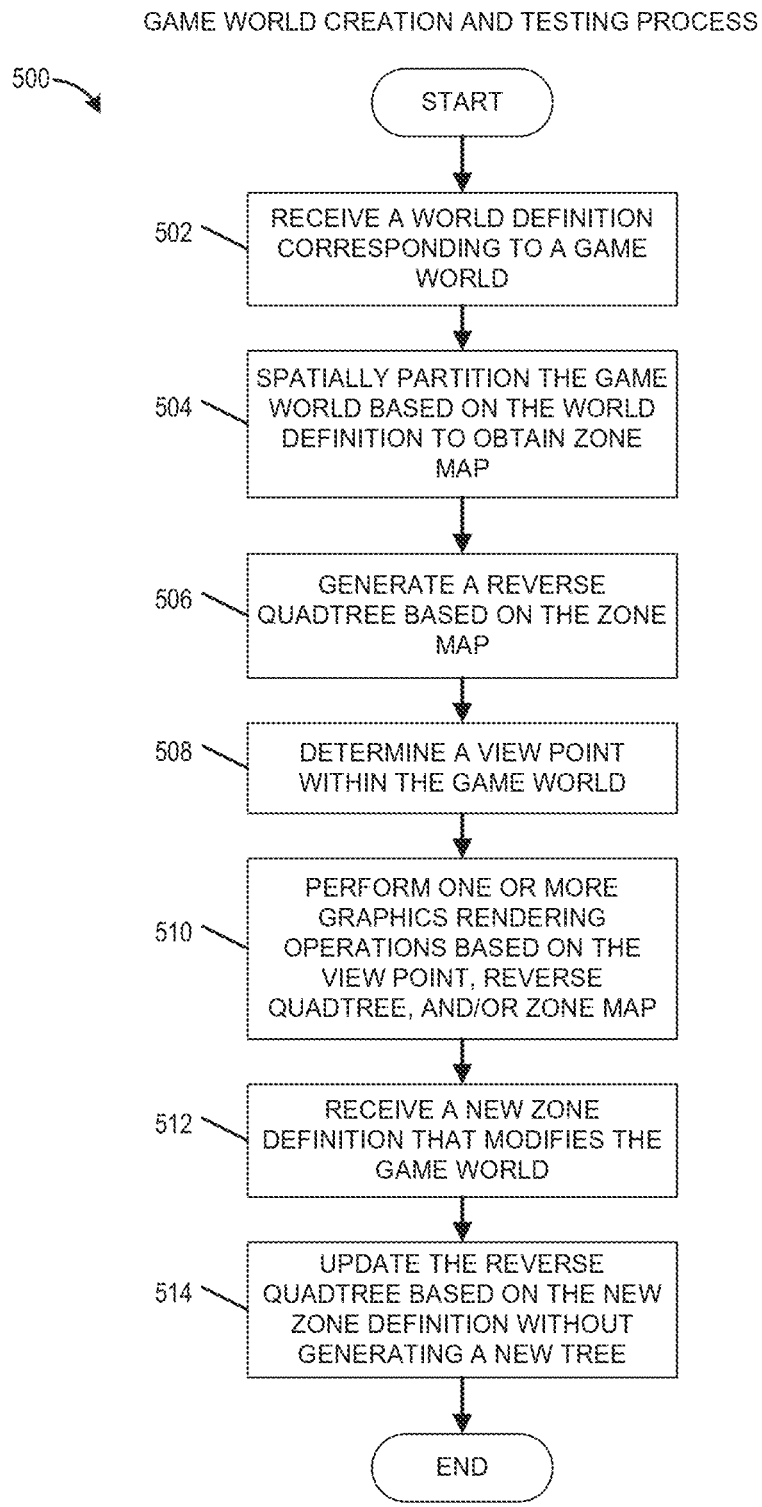
FIG. 5 presents a flowchart of a game world creation and testing process in accordance with certain embodiments.

FIG. 5 presents a flowchart of a game world creation and testing process 500 in accordance with certain embodiments. The process 500 can be implemented by any system that can spatially partition a virtual environment and create a reverse quadtree based on the spatially partitioned virtual environment to facilitate more efficiently rendering the virtual environment during the creation and/or testing of the virtual environment. The process 500, in whole or in part, can be implemented by, for example, a game development system 132, a level editor 134, a spatial partitioning system 136, a game application testing system 130, a client computing system 102, or an interactive computing system 120, among others. Although any number of systems, in whole or in part, can implement the process 500, to simplify discussion the process 500 will be described with respect to particular systems.

The process 500 may begin at block 502 when, for example, the level editor 134 receives a world definition corresponding to a game world or game environment (e.g., the virtual environment represented by zone map 300). The world definition may be received in response to a user interacting with a user interface generated by the level editor 134. For example, in one non-limiting example, the level editor 134 may include a user interface and/or a library of potential world building objects. The user (e.g., a designer) could use the world building objects (e.g., tree, land, building tiles, etc.) to create the virtual environment or game world. Alternatively, or in addition, the world definition may be accessed from a data store, such as the data store 106 or the data store 124.

The world definition may define or specify the features of a game world made up of a single zone of a smallest unit size supported by the level editor 134 (e.g., a single sprite or a single square unit, such as feet, meters, pixels, etc., of land). Alternatively, the world definition may define or specify a game world of any particular size. In some cases, the world definition accessed at the block 502 is a new game world the user is generating with the level editor 134. In other cases, the game world is a world that has previously been created or generated, at least in part, and may be accessed from a data store.

The world definition may include any type of information that may be used to create the game world. This information may include graphical information or images, physics rules, game rules, etc. Further, the world definition may specify types of land or environment (e.g., space, grassland, hills, stone floors, brick, roads, streams, etc.) that make up each zone, tile, or unit of game world. In addition, the world definition may specify objects that are included in the zone, tile, or unit of game world. These objects may include any type of object that may be included as part of a virtual environment, such as trees, animals, non-playable characters, clouds, stars, boxes, stones, caves, mountains, etc. Generally, but not necessarily, interactive objects or characters may be excluded from the world definition. Objects or characters a user may interact with may be added separately to the game world as part of the game application 110 creation process. However, in some cases, objects included as part of the game world can be interacted with.

At block 504, the spatial partitioning system 136 spatially partitions the game world based on the world definition to obtain a zone map, such as the zone map 300G. Spatially partitioning the game world may include dividing the game world into a set of sections, portions, or zones. In some cases, partitioning the game world comprises partitioning the game world into a plurality of smallest units or zones. The size of the smallest units or zones may be specified by a user or may be defined by the level editor 134, game engine, library, or other tool used to code the game application 110. Alternatively, or in addition, spatially partitioning the game world may include aggregating adjacent zones that are identical in type, or dividing the game world into larger zones than the smallest defined unit. As described with respect to FIGS. 3A-3G, the world map may be divided into square zones or tiles matching the smallest buildable unit within the game world. The zones or tiles may be squares, rectangles, hexagons, any other polygon, or otherwise.

At block 506, the spatial partitioning system 136 generates a reverse quadtree based on the zone map. The spatial partitioning system 136 may generate the reverse quadtree using the operations described with respect to the FIGS. 3A-3G. For example, the spatial partitioning system 136 may assign a zone that is associated with the smallest defined unit to a leaf node on the tree. If this is the only zone within the game world, the leaf node may also be the root node. Otherwise, the leaf node may be connected to a root or intermediate node that represents up the four zones of the smallest defined unit, the original zone, and up to 3 adjacent zones (e.g., to the left, bottom, and top, or left, bottom, and a zone below the left zone, etc.). This process may continue until a root node is reached representing the entire game world. The process may then involve traversing back down the tree to add additional intermediate node and leaf nodes to capture any zones of the world not yet added to the reverse quad tree.

In some cases, a conventional quadtree may be used to create an initial tree of the game world. In such cases, the reverse quadtree generation process may be used to add additional zones outside of the bounds of the game world to the quadtree that may be created or specified by the developer subsequent to the initial world definition enabling the quadtree to be modified rather than recreated. The quadtree (or reverse quadtree) may be used when the game world is represented as a 2D world. In some cases when the game world is a 3D world, the quadtree may still be used with additional information or layers added to the leaf nodes to specify 3D aspects of the game world. Using the quadtree to define the 3D world may be acceptable in some cases because often the additional dimensions (e.g., height) is not as detailed or complex as the other dimensions. For example, while the game world may span thousands of meters or hundreds of miles in a 2D plane, the additional dimension is often just a few meters and may have limited characteristics (e.g., static wallpaper or trees that are not interacted with) relative to the 2D plane. However, in other cases, the 3D world may be fully realized in all three dimensions. In such cases, the use of a quadtree may be insufficient for representing the game world and instead other data structures, such as an octree may be used. Further, if the zones are defined using shapes other than squares, alternative data structures may be desired, such as a tree with six leafs per node for a world defined used hexagonal structures.

At block 508, the game development system 132 determines a view point within the game world. The view point may be determined based on a position of a camera within the game application 110, a location of a playable character selected by a user, a location of a character whose viewpoint is being followed, or based on any other factor. Further, the view point may be automatically determined based on a position of a camera or object, or may be specified by a user (e.g., a developer or tester) involved in creating or testing the virtual environment.

At block 510, the game development system 132 performs one or more graphics rendering operations based at least in part on the view point, the reverse quadtree, and/or the zone map. The one or more graphics rendering operations may depend on the type of game application 110, the engine and/or library used, the computer or video game hardware supported, the features of the virtual environment being tested, or any other factor that may affect the selection and/or performance of a graphics rendering operation. The one or more graphics rendering operations can include a ray casting operation, a frustum culling operation, a ray tracing operation, a rasterization operation, or any other type of graphics rendering operation that may be used to create a frame of the virtual environment for display to a user. Moreover, the graphics rendering operations may include or may be used as part of a collision detection operation to detect collisions between objects with portions of the virtual environment, or otherwise.

The graphics rendering operations may be repeated each time the view point changes. For example, as a user rotates the virtual environment or game world during creation and/or testing of the game world, the graphics rendering operations may be repeated. Further, as the user modifies the game world by, for example, adding, deleting, or replacing one zone (or feature thereof) with another zone (or feature thereof), the one or more graphics rendering operations may be repeated to update the view of the game world.

At block 512, the level editor 134 receives a new zone definition that modifies the game world. The new zone definition may be an addition of a zone, the deletion of a zone, the movement of a zone, or the change in feature or characteristics of the zone (e.g., a change in texture or physics rules, etc.). The new zone definition may include any data used to define an area or zone within the game world.

At block 514, the spatial partitioning system 136 updates the reverse quadtree 350 based on the new zone definition without generating a new tree. Further, updating the reverse quadtree 350 may include updating the zone map 300. Updating the zone map 300 and/or quadtree 350 may include updating data stored in the leaf node (or in a memory location associated with the leaf node) corresponding to the modified zone. Alternatively, or in addition, updating the zone map 300 and/or quadtree 350 may include removing a zone or leaf node, adding a zone or leaf node, rebalancing the quadtree, changing the root node, or creating a new level in the tree.

As previously described, the reverse quadtree 350 may be updated without generating a new tree by building, or modifying, the tree from a leaf node and building up towards the root node as described, for example, with respect to the FIGS. 3A-3G. Forming additional tree structure to encompass the new zone definition may include iteratively duplicating a node structure of the reverse quadtree until the new zone is encompassed with the resultant reverse quadtree. Similarly, the zone map may be iteratively duplicated until the new zone is encompassed by the zone map. One example of this iterative duplication of the node structure of the tree and zone map is illustrated in FIGS. 3D-3F where the zone map 300 and the reverse quadtree 350 are iteratively expanded or duplicated until the new node with origin point 316 is encompassed by the zone map 300 and reverse quadtree 350. Further, updating the reverse quadtree 350 without generating a new tree may include reusing portions of the existing reverse quadtree 350 and modifying branches of the tree that include the modified zones while maintaining other branches of the quadtree 350. As previously explained, using a quadtree built from the root nodes to the leaf nodes prevents the addition of zones outside of a fully formed quadtree. However, using the reverse quadtree, it is possible to add new zones even when the existing quadtree is fully formed (e.g., all non-leaf nodes have four branches). Moreover, using a reverse quadtree reduces memory usage and CPU cycles during authorizing or development of the game world as the reverse quadtree can be modified and expanded without needing to expend additional memory or CPU cycles to recreate the quadtree each time a zone in the game world is modified.

Although the operations of the process 500 are described in a particular order, it should be understood that the process 500 is not limited as such. Operations of the process 500 may be performed in an alternative order, serially, or at least partially in parallel. Further, certain operations may be repeated. For example, operations associated with the blocks 504 and 506 may be performed in parallel. Further, operations associated with the blocks 508 and 510 may be performed repeatedly. As another example, the operations associated with the block 512 may be performed prior to the operations associated with the block 510.

Example Computing System

FIG. 6 illustrates an embodiment of a computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
   as implemented by one or more hardware processors of a computing system configured with specific computer-executable instructions,
   obtaining a world definition that specifies features of a virtual environment of a software application;
   spatially partitioning the virtual environment into one or more zones based on the world definition to obtain a zone map of the virtual environment;
   generating a reverse quadtree corresponding to the virtual environment based at least in part on the zone map;
   receiving a zone definition that specifies features of a modification to the virtual environment, wherein the zone definition corresponds to a zone that is external to an outer boundary of the virtual environment; and
   updating the reverse quadtree based at least in part on the zone definition to obtain a modified reverse quadtree, wherein updating the reverse quadtree comprises generating a new root node when the zone is external to the outer boundary of the virtual environment.

2. The computer-implemented method of claim 1, wherein the modified reverse quadtree maintains at least a portion of the reverse quadtree.

3. The computer-implemented method of claim 1, wherein at least one zone of the one or more zones comprises a different size and/or shape within the virtual environment.

4. The computer-implemented method of claim 1, wherein updating the reverse quadtree comprises at least one of: adding a new leaf node corresponding to an additional zone defined by the zone definition; removing a leaf node; rebalancing the reverse quadtree; changing a root node of the reverse quadtree; creating a new level in the reverse quadtree; updating data stored in a leaf node corresponding to a modified zone; or updating data stored in a memory location associated with the leaf node corresponding to the modified zone.

5. The computer-implemented method of claim 1, further comprising:
   determining a viewpoint within the virtual environment; and
   using the modified reverse quadtree, performing one or more graphics rendering operations based at least in part on the viewpoint.

6. The computer-implemented method of claim 5, wherein the one or more graphics rendering operations comprise a ray casting operation, a frustum culling operation, or a collision detection operation.

7. The computer-implemented method of claim 1, wherein updating the reverse quadtree further comprises forming additional tree structure by iteratively duplicating a leaf structure of the reverse quadtree until the zone that is external to an outer boundary of the virtual environment is encompassed within a resultant reverse quadtree.

8. The computer-implemented method of claim 1, wherein the zone definition comprises at least one of: a definition of a new zone within the virtual environment; an indication of movement of an existing zone within the virtual environment; an indication of a modification to a feature or characteristic of an existing zone within the virtual environment; or an indication of a zone to be removed from the virtual environment.

9. The computer-implemented method of claim 1, wherein the modified reverse quadtree is obtained without rebuilding the entirety of the reverse quadtree.

10. A system comprising:
an electronic data store configured to store definitions of virtual environments of a video game; and
a hardware processor of a game development system in communication with the electronic data store, the hardware processor configured to execute specific computer-executable instructions to at least:
access a world definition from the electronic data store, the world definition specifying features of a virtual environment of a software application;
partition the virtual environment into one or more zones based on the world definition to obtain a zone map of the virtual environment;
generate a reverse tree corresponding to the virtual environment based at least in part on the zone map;
receive an indication of a modification to the virtual environment, wherein the indication of the modification to the virtual environment comprises a new zone definition that corresponds to a zone that is external to an outer boundary of the virtual environment; and
update the reverse tree based at least in part on the indication of the modification to the virtual environment to obtain a modified reverse tree, wherein updating the reverse tree comprises forming additional tree structure by iteratively duplicating a leaf structure of the reverse tree until the zone that is external to an outer boundary of the virtual environment is encompassed within a resultant reverse tree.

11. The system of claim 10, wherein the reverse tree and the modified reverse tree are one of: a quadtree, an octree, or a 6-ary tree.

12. The system of claim 10, wherein an indication of the modification to the virtual environment comprises a new zone definition that corresponds to an indication of movement of an existing zone within the virtual environment.

13. The system of claim 10, wherein the modified reverse tree maintains at least a portion of the reverse tree.

14. The system of claim 10, wherein the hardware processor updates the reverse tree by executing the specific computer-executable instructions to at least generate a new root node when the zone is external to the outer boundary of the virtual environment.

15. A computer-implemented method comprising:
as implemented by one or more hardware processors of a computing system configured with specific computer-executable instructions,
obtaining a world definition that specifies features of a virtual environment of a software application;
spatially partitioning the virtual environment into one or more zones based on the world definition to obtain a zone map of the virtual environment;
generating a reverse tree data structure corresponding to the virtual environment based on the zone map, wherein each internal node of the reverse tree data structure has at least four children nodes;
receiving a zone definition that specifies features of a modification to the virtual environment, wherein the modification to the virtual environment corresponds to a zone that is external to an outer boundary of the virtual environment; and
updating the reverse tree data structure based on the zone definition to obtain a modified reverse tree data structure, wherein updating the reverse tree data structure comprises forming additional tree structure by iteratively duplicating a leaf structure of the reverse tree data structure until the zone that is external to an outer boundary of the virtual environment is encompassed within a resultant reverse tree.

16. The computer-implemented method of claim 15, wherein the reverse tree data structure and the modified reverse tree data structure comprise one of: a quadtree, an octree, or a 6-ary tree.

17. The computer-implemented method of claim 15, wherein updating the reverse tree data structure further comprises generating a new root node when the zone is external to the outer boundary of the virtual environment.

18. The computer-implemented method of claim 15, wherein the modification to the virtual environment comprises a new zone definition that corresponds to an indication of movement of an existing zone within the virtual environment.

19. The computer-implemented method of claim 15, wherein the modified reverse tree data structure includes at least a portion of the reverse tree data structure.

20. The computer-implemented method of claim 15, wherein the modified reverse tree data structure is obtained without rebuilding the entirety of the reverse tree data structure.

* * * * *